(12) United States Patent
Peters et al.

(10) Patent No.: US 6,377,950 B1
(45) Date of Patent: Apr. 23, 2002

(54) INTEGRATED DIRECTORY SERVICES

(75) Inventors: Todd Peters, Ottawa; Mark Cloutier, Smith Falls, both of (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/169,644

(22) Filed: Oct. 9, 1998

(30) Foreign Application Priority Data

Oct. 10, 1997 (CA) .............................................. 2217923

(51) Int. Cl.[7] .............................................. G06F 17/30
(52) U.S. Cl. ........................................ 707/10; 707/104
(58) Field of Search ............................. 707/10, 8, 9, 3, 707/6, 201, 203, 104; 379/201, 93.23, 88.14, 58, 88.01; 709/223, 229, 203; 395/712; 370/256

(56) References Cited

U.S. PATENT DOCUMENTS

| | | | |
|---|---|---|---|
| 4,734,931 A | | 3/1988 | Bourg et al. |
| 5,187,735 A | * | 2/1993 | Herrero Garcia et al. ..... 379/88 |
| 5,483,586 A | * | 1/1996 | Sussman ...................... 379/201 |
| 5,689,547 A | * | 11/1997 | Molne .......................... 379/58 |
| 5,758,343 A | * | 5/1998 | Vigil et al. ................... 707/10 |
| 6,016,499 A | * | 1/2000 | Ferguson ..................... 707/104 |
| 6,052,439 A | * | 4/2000 | Gerszberg et al. ........ 379/88.01 |
| 6,064,723 A | * | 5/2000 | Cohn et al. ............... 379/88.14 |
| 6,081,585 A | * | 6/2000 | Gaillard .................... 379/93.23 |
| 6,098,099 A | * | 8/2000 | Ellesson et al. ............. 709/223 |
| 6,115,549 A | * | 9/2000 | Janis et al. .................. 395/712 |
| 6,122,258 A | * | 9/2000 | Brown ......................... 370/256 |
| 6,157,942 A | * | 12/2000 | Chu et al. .................... 709/203 |
| 6,209,036 B1 | * | 3/2001 | Aldred et al. ............... 709/229 |

* cited by examiner

Primary Examiner—Sanjiv Shah
(74) Attorney, Agent, or Firm—Keating & Bennett, LLP

(57) ABSTRACT

An integrated directory services system is provided for synchronizing records in a central directory server with records in a telephony system. The inventive system comprises a data storage table for storing directory import and export records, and a process which communicates with the directory server via Lightweight Directory Access Protocol (LDAP) for (i) importing the directory import records from the directory server and writing the directory import records to the data storage table, (ii) reading successive ones of the directory import records from the data storage table and translating the directory import records to the telephony system, whereupon records in the telephony system are synchronized with the directory import records, (iii) reading successive records from the telephony system and in response writing the directory export records to the data storage table, and (iv) reading the directory export records from the data storage table and exporting the directory export records to the directory server, whereupon the records in the directory server are synchronized with the directory export records.

16 Claims, 15 Drawing Sheets

FIG. 4

| Todd Peters Properties | ☒ |

Distribution Lists | E-mail Addresses | Delivery Restrictions | Delivery Options
General | Organization | Phone/Notes
Protocols | Custom Attributes | Advanced | Mitel OPS Manager Todd Peters ☑ Managed by OPS Manager OPS Manager Directory Imformation

| Name: | Peters, Todd | Update Values |
| Number: | 520-1671 | ☐ Private Number |
| Department: | Design |
| Location: | Kanata |
| Home Element: | P-41 ▼ |
| Device Type: | Superset 420 ▼ |
| PLID: | [1] [1] [3] [15] |
|  | cab shelf slot cct |

Mitel

OK | Cancel | Apply | Help

FIG. 5

| Brian Niebuhr/Kan/Mitel | | □ □ ☒ |

[ Close ]  [ Edit Person ]

Person: Brian Niebuhr/Kan/Mitel
Brian Niebuhr/Kan/Mitel ● Mitel

| Name | | Mail | |
|---|---|---|---|
| First name: | Brian | Mail system: | Notes |
| Middle initial: | | Domain: | Mitel |
| Last name: | Niebuhr | Mail server: | Inkandb1/Mitel |
| User name: | Brian Niebuhr/Kan/Mitel<br>Brian Niebuhr<br>BRIAN_NIEBUHR | Mail file: | mail\bniebuhr |
| Short name and/or Internet address: | BNiebuhr | Forwarding address: | |
| HTTP password: | | | |

| Work | | Home | |
|---|---|---|---|
| Title: | | Street address: | |
| Company: | | City: | |
| Department: | | State/province: | |
| Location: | Kanata | Zip/postal code: | |
| Manager: | | Country: | |
| Office phone: | 520-1000 | Home phone: | |
| FAX phone: | | FAX phone: | |
| Cell phone: | | Spouse: | |
| Assistant: | | Children: | |

| Misc | |
|---|---|
| Comment: | |
| Encrypt incoming mail: | No |
| OtherX.400 address: | |
| Calender domain: | |

▬ Mitel

INTEGRATED DIRECTORY SERVICES

FIELD OF THE INVENTION

This invention relates to voice and data communication systems, and more particularly to a method and apparatus for synchronizing a central directory server (DS) with a telephony system.

BACKGROUND OF THE INVENTION

Traditionally, in a corporate enterprise having both a data communication system (e.g. email server) and a voice communication system (e.g. a PABX), or an integrated voice and data system (e.g. a so-called Voice-LAN system), directory servers such as Microsoft Exchange® or Lotus Notes® have been physically and logically separated from the telephone directory. Accordingly, every time a change has been required to be made to data which is common to both directories (e.g. add new user, delete user, modify user data, etc.), independent manual changes have been required to be made to both directories. Clearly, this has been a time consuming and labor intensive procedure which typically requires the involvement of both a network administrator and a PBX system administrator. Duplicate data entry also leads to occasional errors and inconsistencies in the separately entered data, resulting in un-synchronized databases.

SUMMARY OF THE INVENTION

According to the present invention, an Integrated Directory Services system (IDS) is provided for synchronizing data in a central Directory Server (DS), such as Microsoft Exchange® or Lotus Notes®, with a telephone directory of a PBX, either directly or via a dedicated server (referred to herein as OPS Manager). Data synchronization is accomplished by importing and exporting additions, modifications and deletions of information between the DS and OPS Manager, as required, either incrementally or fully.

The Integrated Directory Services system according to the present invention provides a single administration point (at the DS or OPS Manager or enterprise PBX) for all additions, deletions and data changes which are then automatically propagated to the other databases, thereby alleviating the duplicate data entry required in existing systems and ensuring consistent information in all databases. The dynamic automated system of the present invention also provides substantial time savings over the prior art in achieving directory synchronization.

According to a further aspect of the invention, for a large enterprise comprising several PBXs, multiple OPS Manager servers can be synchronized to each other using the DS as an intermediary.

BRIEF DESCRIPTION OF THE DRAWINGS

In the accompanying drawings which illustrate a working embodiment of the invention:

FIG. 4 shows a proprietary information property sheet for Microsoft Exchange®, used for entering data in predetermined fields, in accordance with the invention;

FIG. 5 shows an Address Book main form for Lotus Notes®;

DESCRIPTION OF THE PREFERRED EMBODIMENT

Figure 1:
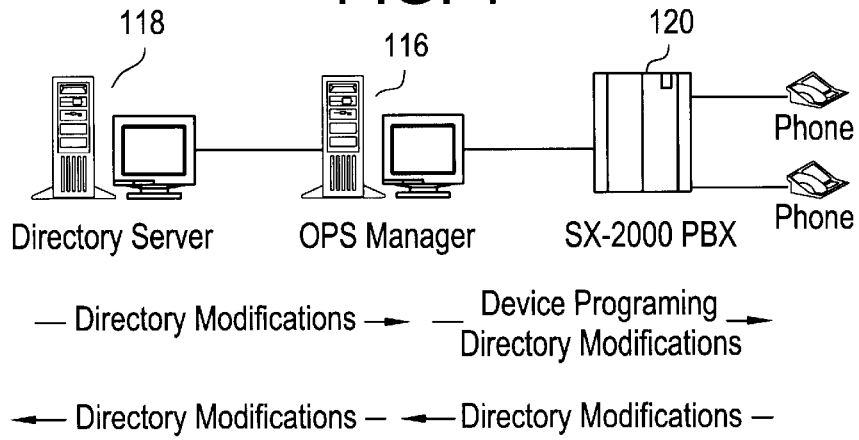
FIG. 1 is a diagram showing information flow between a DS, OPS Manager and PBX according to the DS system of the present invention.

As shown in FIG. 1, according to one aspect of the IDS system of the present invention, directory information is synchronized between one central corporate Directory Server (DS) 118, an OPS Manager server 116, and an enterprise PBX network 120. This synchronization provides a single administration point for each of the servers and the PBX, as indicated by the bidirectional flow of information. In FIG. 1, the term Directory Modification pertains to any required modification such as a Move, Add, Change or Delete.

Directory information is maintained in synchronization between the DS 118, OPS Manager 116 and PBX 120 via the importing and exporting of directory information. As discussed above, there are known mechanisms for moving directory information between the OPS Manager 116 and the PBX 120, but the system of the present invention provides a mechanism for moving directory information between the DS 118 and the PBX 120 via OPS Manager 116.

According to the preferred embodiment, the user is given the ability to schedule and manage events for performing Full Directory Imports from the DS 118, Full Directory Exports to the DS 118, Incremental Synchronization between the DS 118 and OPS Manager 116 and Deletion Discovery within the DS 118. These events form part of IDS configuration on the OPS Manager station 116. However, it is preferred that the DS 118 function as the central administration point for all DS 118, OPS Manager 116 or PBX 120 modifications (i.e. directory moves, adds, changes or deletes).

In order to function as the central administration point, the DS 118 contains the following information: Name, Number, Department, Location, Device Type, PLID, Home Element, and Private Number. This is sufficient information on the DS 118 to initiate the programming or deprogramming of a device on the PBX 118 from the DS level. Not all of these fields are mandatory, but for an action such as an add on the DS 118 to result in device programming, certain fields must be specified. These are: Number, Device Type, PLID, and Home Element. For example, if an new entry is added to the DS 118 that contains the required fields, that entry gets imported by the OPS Manager 116 and the device is then programmed on the PBX 120 by way of the Move, Add and Change (MAC) application discussed in greater detail below.

Although it is recommended herein that administration be performed at the DS level, these tasks can nonetheless be performed at all three levels—DS 118, OPS Manager 116 and PBX 120. Modifications made on the PBX 120 are collected by the OPS Manager 116 and in turn transmitted to the DS 118. Modifications made on OPS Manager 116 are exported to the DS 118 and to the PBX 120. All systems stay in synchronization regardless of where the modification is initially made.

The information transfer between OPS Manager 116 and the DS 118 is initiated and performed by the OPS Manager 116 using the LDAP protocol (Lightweight Directory Access Protocol). The OPS Manager 116 initiates a connection with the DS 118 and authenticates itself to the DS using standard username/password authentication. Once authenticated, information transfer between the DS 118 and OPS Manager 116 can commence.

Having the ability to modify directory entries on any system introduces the possibility of entry collision. If the same entry is modified concurrently on both the DS 118 and OPS Manager 116 there is the possibility that the actions or modifications will conflict with each other. The IDS system of the present invention uses conflict resolution to deal with this situation. In many instances, conflict resolution involves combining the changes made and distributing them to both the DS 118 and OPS Manager 116. In the event of an unresolvable conflict (e.g. the DS 118 attempts to delete an entry while the OPS Manager 116 is attempting a change) the DS 118 is permitted to prevail and the requested action is performed on the OPS Manager 116. The OPS Manager modification is logged and discarded.

It is contemplated that some applications and some existing PBX equipment may impose restrictions on string field length. These restrictions can be handled by applying truncation rules to affected fields at the DS level (e.g. the Name, Department and Location fields). If truncations are considered to be undesirable, the truncated fields can be later modified on any of the systems (i.e. DS 118, OPS Manager 116 or PBX 120).

The ability to synchronize directories automatically via scheduled events, combined with the central administration point of the Directory Server 118 results in a more efficient system as a whole than when the DS 118, OPS Manager 116 and PBX 120 directories are maintained independently, and provides greater information consistency between the individual systems.

Figure 2:
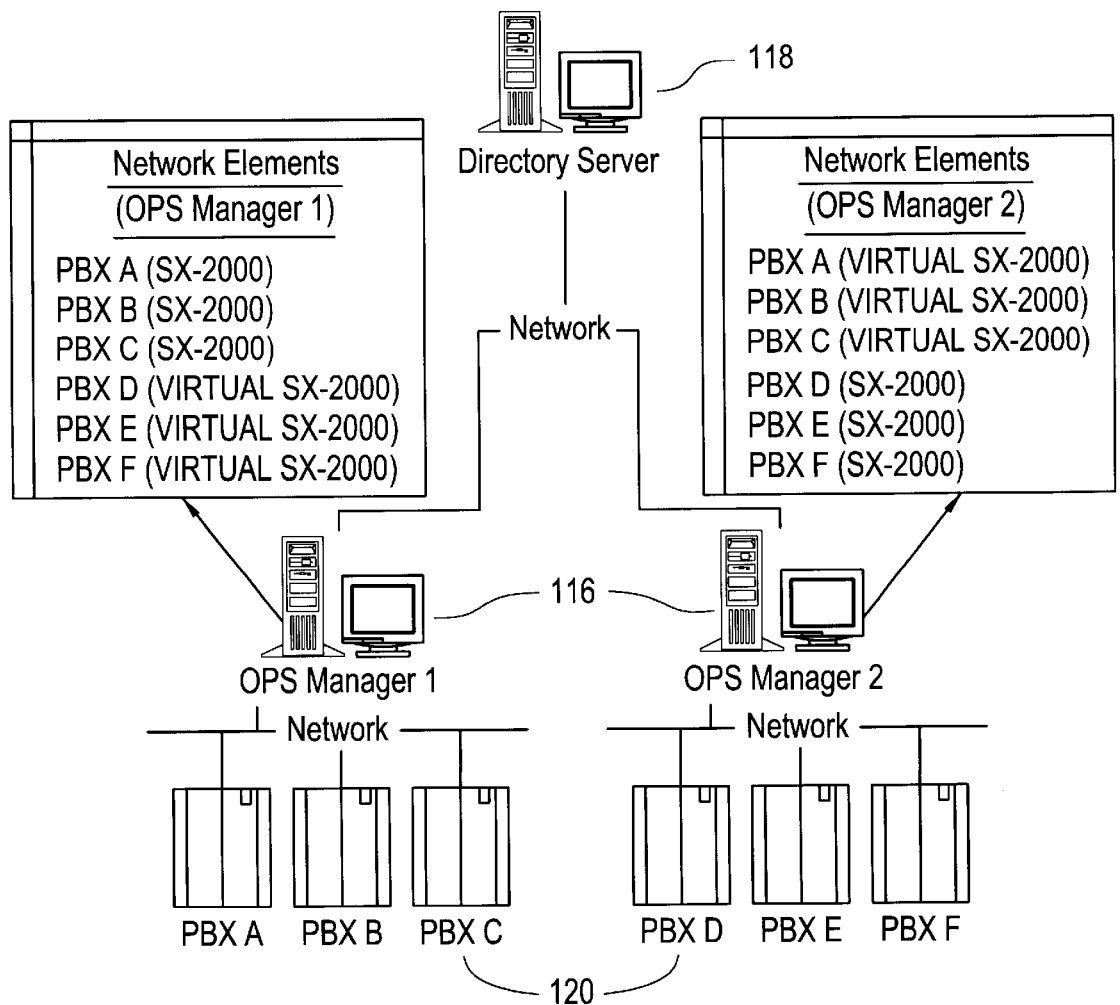
FIG. 2 is a diagram showing information flow for multiple OPS Manager server synchronization according to an alternative embodiment of the invention.

According to the alternative embodiment discussed above, the IDS of the present invention also provides synchronization between multiple OPS Managers 116 (e.g. OPS Manager 1, OPS Manager 2, etc.), using the DS 118 as a central information store (see FIG. 2). It should be noted that all of the networks shown in FIG. 2 may be the same or separate networks.

In order to implement the synchronization of multiple OPS Managers, each OPS Manager 116 must be programmed to accept Telephone Directory entries from PBXs 120 (e.g. PBX A, PBX B, etc.) that are managed by another OPS Manager. This is accomplished by programming and managing a Virtual representation of each PBX 120, referred to herein as a VPBX. VPBXs must have the same name as their "real" counterparts.

In FIG. 2, both OPS Manager 1 and OPS Manager 2 have all PBXs in the network programmed, even though all PBXs may not be directly managed by the specific OPS Manager. Both OPS Manager 1 and OPS Manager 2 can contain any entry from PBXs A, B, C, D, E or F.

If the VPBXs are not programmed, entries will not be exchanged between the OPS Manager 116 and the DS 118. For example, if the Network Elements for OPS Manager 1 of FIG. 2 are programmed as shown below with reference to Table A, then only entries from PBXs A, B, C, and E can be exchanged between OPS Manager 1 and the DS 118, even though the DS 118 contains all managed entries from PBXs A, B, C, D, E, and F.

TABLE A

| Network Elements (OPS Manager 1) |
| --- |
| PBX A (SX-2000) |
| PBX B (SX-2000) |
| PBX C (SX-2000) |
| PBX E (Virtual SX-2000) |

In order to disable the multiple synchronization functionality of the present invention, the user merely omits programming any VPBXs through network element user interfaces. When disabled in this manner, both OPS Manager stations OPS Manager 1 and OPS Manager 2 can still be centrally managed by the DS 118 without the entries of one OPS Manager appearing on the other OPS Manager.

If security is a consideration between OPS Manager stations (e.g. preventing OPS Manager 1 from being able to add/modify/delete information from OPS Manager 2 and PBXs D, E and F) then all that is required is to program the DS 118 to restrict the access rights of the OPS Manager 116 to entries in its local domain (i.e. OPS Manager 1 can be restricted to entries in PBXs A, B and C).

The IDS installation on DS 118 for use with Microsoft Exchange® is as per the conventional installation instructions for "Add-ins". A property sheet, discussed in greater detail below, is compiled and linked together as a DLL and put into a directory structure inside the Exchange folder. Next, the Exchange Administrator program is used to configure the "Add-in". The DLL associated with the new server property sheet is associated with the Add-in, and the Add-in template is applied to all existing mailboxes.

Figure 3:
FIG. 3 shows a general information entry form for Microsoft Exchange®.

Turning to FIG. 3, the general information form window is shown for Microsoft Exchange®. Adding and modifying entries is as per usual, other than the original instantiation of the "Properties" dialog. Thus, for a new entry the user selects "File—New Mailbox . . . " within Exchange® resulting in display of the Properties dialog. For an existing entry, the user selects the desired mailbox from a list of recipients and chooses "File—Properties . . . ", resulting in the Properties dialog being displayed. Alternatively, the emailbox can be double-clicked to display the Properties dialog. The user then fills in or edits the appropriate information on the "General" property sheet of FIG. 3 and switches to and completes entries in a "Mitel" property sheet, shown in FIG. 4, by means of the "Mitel OPS Manager" tab. The minimum fields which must be completed in the window displays of FIGS. 3 and 4, are first and last names as well as phone. Also it should be noted that the Name, Number, Department and Location fields are automatically filled in on the "Mitel" property sheet of FIG. 4 upon prior entry of this information in the "General" property sheet of FIG. 3.

According to the preferred embodiment, the information entered into the fields of the "Mitel" property sheet of FIG. 4, should comply with the following specifications:

Name—this is a computed value of the format "last, first" (last and first being derived from the "General" property sheet) up to a maximum of 21 characters, including the comma. Any letters beyond 21 are truncated. This field can be edited in the event of an undesirable truncation. Editing the field has no effect on the original first and last fields. Whether edited or not, this is the form of name field that is received by the OPS Manager 116 and the PBX 120.

Number—this is an exact copy of the number field from the General property sheet. It should be noted that the number should be the person's full directory entry.

Department—this is a direct copy of the Department field from the General property sheet. In the preferred embodiment, as discussed above, this field is truncated by 10 characters due to limitations on the PBX. This field is directly linked to the Department field on the General property sheet (i.e. if this field is edited, the Department field on the property sheet will be updated as well).

Location—this is a direct copy of the Office field from the General property sheet. This field is truncated beyond 10 characters due to limitations on the PBX of the preferred embodiment. This field is directly linked to the Office field on the General property sheet (i.e. if this field is edited, the Office field on the General property sheet will be updated as well).

PLID—this is the Physical Location IDentifier on the PBX 120, and consists of a series of four integers of the form "w x y z." This data must be supplied to the administrator who is entering the data.

Device Type—this is the type of device (e.g. telephone set) that is associated with the PLID. This field appears as a pull-down list with all available device types displayed in the list. This data must be supplied to the administrator who is entering the data.

Home Element—this is the PBX (or in a Voive-LAN system the Call Server) where the device physically resides. This field appears as a pull-down list with all available home elements displayed in the list. This data must be supplied to the administrator who is entering the data.

Private Number—this field is a Boolean. It designates how numbers are displayed by the PBX 120 on telephone sets connected thereto. It has relevance only on the PBX but is included here for multiple-OPS Manager synchronization. This data must be supplied to the administrator who is entering the data. As indicated above, this information is not absolutely required to perform device programming.

Managed By OPS Manager Checkbox—this field specifies whether the entry is kept in synchronization by the IDS system of the present invention. It is either checked or unchecked. There are actions associated with checking or unchecking this field, which are as follows:

| CHANGE | ACTION |
| --- | --- |
| Unchecked to Checked | ADD on OPS Manager |
| Checked to Unchecked | DELETE on OPS Manager |

Figure 6:
FIG. 6 shows a proprietary information property sheet for Lotus Notes®, used for entering data in predetermined fields in accordance with the invention.

The IDS installation on DS 118 for use with Lotus Notes® is via a Lotus Script to create fields on a subform of the main Lotus Notes address book. The script performs a number of steps. Firstly, it prompts for the name of the main Lotus Notes address book form template (FIG. 5). Next, a subform is created at the bottom of the main form (FIG. 6). Then, the fields name, number, department, location, PLID, Device Type, Home Element, Private Number are created on the subform. An "Managed by OPS Manager" checkbox is then created on the subform, and the template is applied to all existing entries.

Turning to FIG. 5, the Lotus Notes Address Book main form window is illustrated. As with Microsoft Exchange®, there is no difference in adding or modifying entries other than instantiation of the public address book. For a new entry, the user opens the Public Address Book and selects "Add Person". For an existing entry, the user selects the Public Address Book and double-clicks on the entry to be edited. The user then fills in or edits the appropriate information on the Address Book Main form shown in FIG. 5 and then switches to the "Mitel" subform for Lotus Notes (FIG. 6), which contains the identical fields to be completed as discussed above with reference to FIGS. 3 and 4.

Before turning to a discussion of the detailed IDS architecture shown in FIGS. 7 to 21, a description is provided immediately below of the various user steps for performing directory tasks to be synchronized via the IDS system of the present invention. The following description includes some functional description of the IDS system which synchronizes the DS 118 and OPS Manager 116.

Performing A Full Import from DS 118

Upon scheduling and performing a full import, an LDAP Client (i.e. LDAPUTL.DLL discussed below with reference to FIGS. 7, 8 and 13) on OPS Manager 116 requests all "IDS-Managed" entries from the DS 118. Each imported entry is then compared via the IDSXL8R.DLL (discussed in detail below with reference to FIGS. 7, 8 and 19) to its corresponding entry on OPS Manager 116. If the corresponding entry needs to be updated with different information then it is updated. If there is no corresponding entry, an entry is created. If the imported entry is marked as deleted, the corresponding entry on the OPS Manager 116 is deleted. It should be noted that a full import does not overwrite the entire OPS Manager directory, it merely updates the existing directory.

Performing a Full Export to the DS 118

Upon scheduling and performing a full export, the LDAP Client (i.e. LDAPUTL.DLL) on OPS Manager 116 performs a compare of its "IDS-Managed" directory entries with their corresponding entries on the DS 118. If an entry does not exist on the DS 118, it is created.

If the DS entry requires modification, appropriate modification of the entry is effected. This can include modification of the IDS-Managed field (i.e. the DS 118 may have the entry marked as non-managed, but it may become IDS-managed when the export is performed because the entry is marked as IDS-managed on OPS Manager 116). It should be noted that a full export does not overwrite the entire DS directory, it merely updates the existing DS directory.

Performing a Synchronization with the DS 118

A synchronization event combines the functionality of an import and an export event. First, an import of modified entries is performed and processed on OPS Manager 116. Then an export of all existing deltas (i.e. changes) for the DS 118 is performed. Only differences in entries flow between OPS Manager 116 and the DS 118 during this operation.

The IDS system implements the following steps when performing a synchronization:

1. Schedule a synchronization.
2. Perform the synchronization at the scheduled time or on demand.

Performing a DS 118 Deletion Discovery Event

A deletion discovery event compares what OPS Manager 116 expects to find on the DS 118 (information derived from a Teldir database discussed in greater detail below) to what is actually there and determines if any entries have been deleted from the DS 118. If entries are found to have been deleted on the DS 118, those entries are also deleted from OPS Manager 116.

The IDS system of the present invention takes the following actions when performing a deletion discovery:

1. Schedule a deletion discovery.
2. Perform the deletion discovery at the scheduled time or on demand.

MAC: Invoking a Move from the DS 118

The IDS system of the present invention extends the capabilities of MAC (i.e. Moves, Adds, Changes) to an administrator at the DS level. In order to invoke a MAC Move from the DS 118, the administrator performs the following steps:
1) Select the entry which the move will be performed on.
2) Display the entry in the DS editor.
3) Display the Mitel-specific information.
4) Enter the new PLID, Home Element and/or Device Type.
5) Save the modifications.

Invoking a move from the DS 118 is the equivalent of changing the PLID, Home Element and/or Device Type for the entry. Upon saving the modifications the entry is timestamped with the current time. During its next synchronization event, the IDS system imports the entry into OPS Manager 116 due to the recent timestamp. Once the information is on OPS Manager 116 the type of action is determined, in the present case a Move, and the information, action and appropriate template are transferred to MAC control.

MAC: Invoking an Add from the DS 118

The IDS system of the present invention extends the capabilities of MAC to an administrator at the DS level. To invoke a MAC Add from the DS 118, the administrator performs the following steps:
1) Create a new entry on the DS 118.
2) Display the new entry in the DS editor.
3) Fill in appropriate information on the Main form. Ideally, the administrator supplies First Name, Last Name, Telephone Number, Department and Location. Minimally, the administrator supplies First Name, Last Name and Telephone Number.
4) Display the Mitel-specific information. In this regard, several fields are displayed. The Name field is a concatenation of the First Name and Last Name fields in the format "Last Name, First Name" truncated at 21 characters. Truncation is not performed if the Name length does not exceed 21 characters. Similarly, the Department and Location fields are based upon their counterparts on the main form. They are truncated at 10 characters if necessary. Any of the truncated fields can be modified with no effect on the original fields on the main form.
5) Modify truncations to Name, Department and Location if necessary.
6) Fill in the appropriate information on the Mitel-specific form. Ideally, the administrator supplies Home Element, PLID, Device Type, Private Number. Minimally, the administrator supplies Home Element, PLID and Device Type.
7) Save the modifications.

It should be noted that if the minimum information is not supplied, actual device programming on the PBX 120 will not occur. The add will be blocked at OPS Manager 116 and will require manual intervention by the administrator.

Upon saving the modification, the entry is timestamped with the current time. During its next synchronization event, the IDS system imports the entry into OPS Manager 116 due to the recent timestamp. Once the information is on OPS Manager 116 the type of action is determined, in this case an Add, and the information, action and appropriate template are transferred to MAC control.

MAC: Invoking a Change from the DS 118

The IDS system of the present invention extends the capabilities of MAC to an administrator at the DS level. To invoke a MAC Change from the DS 118, the administrator executes the following steps:
1) Select the entry which the change will be performed on.
2) Display the entry in the DS editor.
3) Change information on the Main Form if desired.
4) Display the Mitel-specific information.
5) Change information on the Mitel-specific form if desired, (it should be noted that changing PLID or Home Element will result in a MAC Move.) If any of the source fields are changes on the Main Form, the Name, Department or Location fields get updated.
6) Save the modifications.

Invoking a change from the DS 118 is the equivalent of changing any information other than Home Element or PLID for the entry. Upon saving the modification, the entry is timestamped with the current time. During its next synchronization event, the IDS system imports the entry into OPS Manager 116 due to the recent timestamp. Once the information is on OPS Manager 116 the type of action will be determined, in this case a Change, and the information, action and appropriate template are transferred to MAC control MAC: Invoking a Delete from the DS The IDS system of the present invention extends the capabilities of MAC to an administrator at the DS level. In order to invoke a MAC Delete from the DS 118, the system administrator implements the following steps:
1) Select the entry which the delete will be performed on.
2) Delete the entry on the DS 118 (or uncheck the IDS-Managed checkbox).

Upon saving the modification, the entry is deleted. During its next Deletion Discovery event, the IDS system finds the deleted entry on the DS 118 and marks the corresponding entry on OPS Manager 116 for deletion. The delete then proceeds through the MAC mechanism in the usual manner.

MAC: Adding an Entry on OPS Manager 116

It is recommended that an add of a new entry be performed from the DS level. A new entry added through MAC on the OPS Manager station 116 is added to the DS 118 if a corresponding entry does not already exist. In order to add an entry on the DS 118 and the PBX 120 from the MAC user interface on OPS Manager 116, the administrator performs the following steps:

1) Start the MAC application.
2) Add a user entry from MAC.
3) When the operation is complete, quit the MAC application.

Performing an Add on OPS Manager 116 is a special case for the IDS system because a newly added entry on OPS Manager 116 does not yet have a DS identifier which is required for synchronization with the DS 118. The specifics of the DS identifier are set forth in greater detail below. For this reason, the IDS system initially uses "name+number" as a key. When the entry is "added" to the OPS Manager 116 and PBX 120 through MAC, it is timestamped with the current time. During the next synchronization event, IDS exports the entry to the DS 118. The IDS system first checks if an entry with the same "name+number" exists and if not it performs the add. The DS identifier is then immediately retrieved from the DS 118 and stored on the OPS Manager station 116. The DS identifier is used as the key between the DS 118 and OPS Manager 116 from this stage onward. If there is already an existing entry with the same "name+number", the DS identifier is retrieved and the action is treated as a Modification instead of an Add. This situation is logged on OPS Manager 116.

MAC: Deleting an Entry on OPS Manager 116

It should be noted that a delete of an entry should be performed from the DS level. Deleting an entry on OPS Manager 116 using MAC is the equivalent of not managing the entry on the DS 118 and deletion of Mitel-specific information from the DS entry. The number field on the DS 118 is also deleted. In order to unmanage an entry at the DS-level from OPS Manager 116 using MAC, the following steps are performed:

1) Start the MAC application.
2) Choose the entry to be deleted.
3) Delete the entry.
4) When the operation is complete, quit the MAC application.

When the entry is deleted from OPS Manager 116 the modification is recorded. During the next synchronization event the appropriate entry is located on the DS 118 and the IDS-Managed checkbox field is cleared. Next, the Mitel-specific information is cleared, as is the telephone number. The entry is not deleted from the DS 118.

MAC: Modifying an Entry on OPS Manager 116

It is recommended that modifications to an entry be performed from the DS level. In order to modify an entry on OPS Manager 116 and have the changes reflected on the DS 118, the following steps are performed:

1) Start the MAC application.
2) Choose the entry to be modified.
3) Perform a "Move" or a "Change."
4) When the operation is complete, quit the MAC application.

Modifying an entry from OPS Manager 116 is a standard operation since the DS identifier is already known. When the entry is modified on OPS Manager 116 through MAC, the modification is recorded. During the next synchronization event, IDS exports the changes to the entry on the DS 118.

Teldir: Adding an Entry on OPS Manager 116

It is recommended that an add of a new entry be performed at the DS level. A new entry added through Teldir on the OPS Manager station 116 will be added to the DS if a corresponding entry does not already exist. In order to add an entry on the DS 118 from the Teldir user interface on OPS Manager 116, the following steps are performed:

1) Start the Teldir application.
2) Create a new entry.
3) Quit the Teldir application.

Performing an Add on OPS Manager 116 is a special case for the IDS system because a newly added entry on OPS Manager 116 does not yet have a DS identifier which is required for synchronization with the DS 118. For this reason, the IDS system initially uses "name+number" as a key. When the entry is "added", the addition is recorded. During the next synchronization event, IDS exports the entry to the DS 118. The IDS system first checks if an entry with the same "name+number" exists and if not it performs the add. The DS identifier is then immediately retrieved from the DS 118 and stored on the OPS Manager station 116. The DS identifier is used as the key between the DS 118 and OPS Manager 116 from this stage onward. If there is already an existing entry with the same "name+number", the DS identifier is retrieved and the action is treated as a Modification instead of an Add. This situation is logged on OPS Manager 116.

Teldir: Deleting an Entry on OPS Manager 116

It is recommended that a delete of an entry be performed from the DS level. Deleting an entry on OPS Manager 116 using Teldir is the equivalent of not managing the entry on the DS 118 in combination with deletion of Mitel-specific information from the DS entry. The number field on the DS 118 is also deleted. In order to unmanage an entry at the DS-level from OPS Manager 116 using Teldir, the following steps are performed:

1) Start the Teldir application.
2) Choose the entry to be deleted.
3) Delete the entry.
4) Quit the Teldir application.

When the entry is deleted from OPS Manager 116, the deletion is recorded. During the next synchronization event the appropriate entry is located on the DS 118 and the IDS-Managed checkbox field is cleared. Next, the Mitel-specific information is cleared, as is the telephone number. The entry is not deleted from the DS 118.

Teldir: Modifying an Entry on OPS Manager 116

It is recommended that modifications to an entry be performed from the DS level. In order to modify an entry on OPS Manager 116 and have the changes reflected on the DS 118, the following steps are performed:

1) Start the Teldir application.
2) Choose the entry to be modified.
3) Modify the entry.
4) Quit the Teldir application.

Modifying an entry from OPS Manager 116 is a standard operation since the DS identifier is already known. When the entry is modified on OPS Manager 116 through Teldir, the modification is recorded. During the next synchronization event, IDS exports the changes to the entry on the DS 118.

Although not described in detail herein, it will be appreciated by a person skilled in the art that means are provided within the scope of the invention to allow the administrator to perform an initial OPS Manager/DS synchronization with the DS 118 functioning as Master as well as an initial OPS Manager/DS Synchronization with OPS Manager 116 as the Master.

Enabling Multiple OPS Manager Synchronization

The following steps are followed when enabling Multiple OPS Manager Synchronization for the first time on a OPS Manager station 116.
1) Identify the unmanaged PBXs 120 that must be added to the OPS Manager station 116 as Virtual PBXs (VPBX).
2) Start the Network Elements Editor.
3) Add a VPBX.
4) Commit the entry.
5) Repeat steps 3 and 4 for each VPBX to be added.
6) Close Network Elements Editor.

These steps should be executed at an idle time on the OPS Manager station 116 since they will result in an influx of Telephone Directory entries. Once the network elements have been configured, MVSync is fully configured for the particular OPS Manager 116. The next time IDS contacts the DS 118 during a Directory Sync event, entries residing on the new VPBXs are requested along with changes to existing entries. Depending upon the number of incoming entries, performance on the OPS Manager station 116 may be degraded. During this time, OPS Manager 116 is generating "Deltas" which are distributed to each of its managed PBXs 120. VPBXs do not receive Deltas.

Using OPS Manager Tools From the Directory Server 118. OPS Manager tools can be launched and used from the DS 118 in order to check the success or failure of imported entries. The tools available are: MAC and Teldir.

Figure 7:
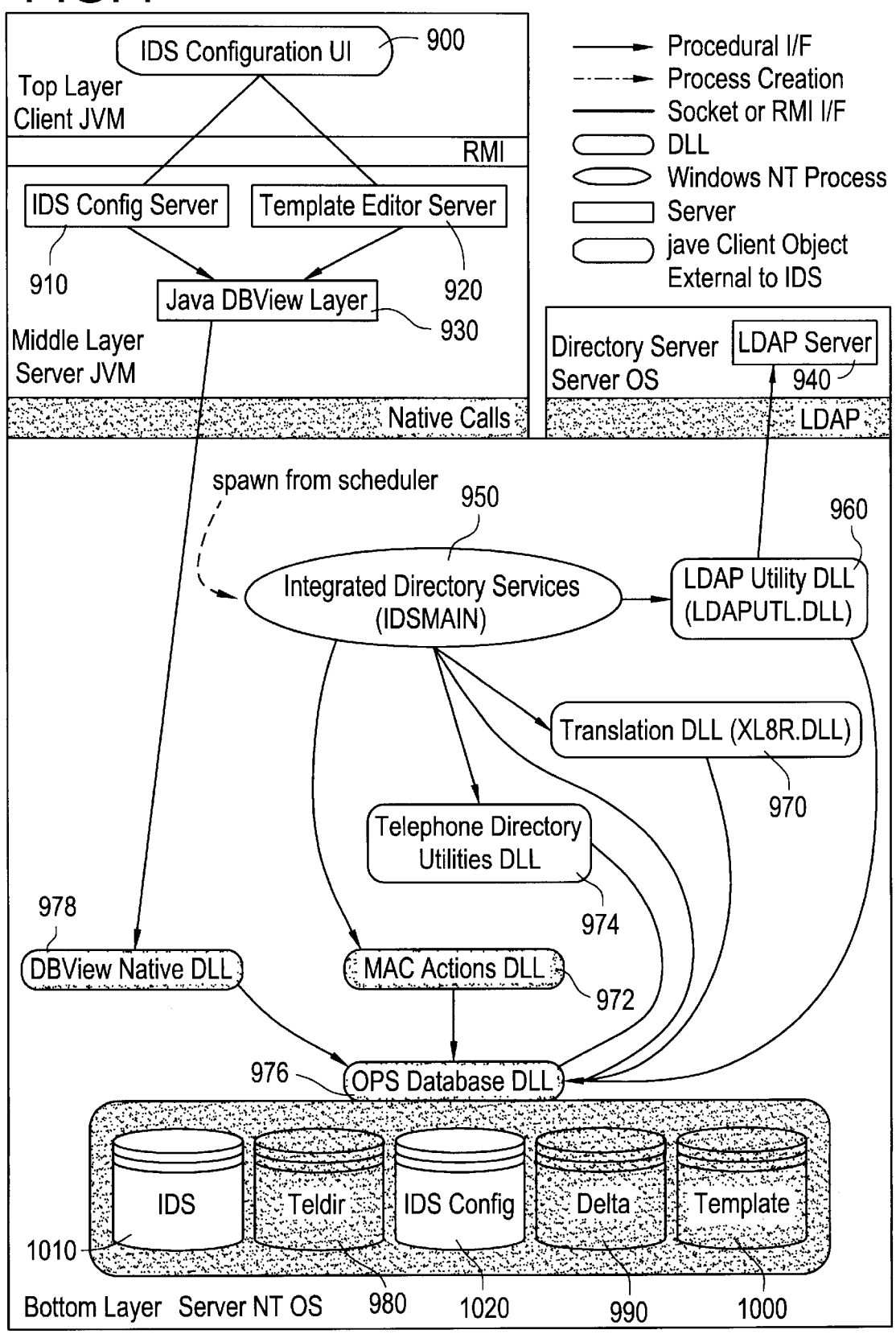
FIG. 7 shows the IDS architectural structure according to the preferred embodiment of the invention.

Turning now to FIG. 7, the IDS architectural structure is shown, wherein shaded blocks represent the environment in which the system of the present invention operates while un-shaded blocks represent the functional elements of the system according to the preferred embodiment. In addition to the IDS Configuration UI 900 running in the Top Layer Client Java Virtual Machine, which calls IDS Configuration Server 910 and Template Editor Server 920, both of which call Java DBView Layer 930 in the Middle Layer Server Java Virtual Machine, and in addition to the LDAP Server 940 residing in the Directory Server Operating System 118, the IDS system of the present invention adds three main functional pieces: the Integrated Directory Services process 950 (IDSMAIN), the LDAP Utility DLL 960 (LDAPUTL.DLL), and the Translation DLL 970 (IDSXL8R.DLL). The IDSMAIN process 950, LDAPUTL.DLL 960 and IDSXL8R.DLL 970 communicate with various database tables via the MAC Actions DLL 972, Telephone Directories Utilities DLL 974 and OPS Database DLL 976, as described in greater detail below. Also, the Java DBView Layer 930 places Native Calls to the OPS Database DLL 976 via DBView Native DLL 978.

Also, in addition to the known Teldir database table 980, Delta Table 990 and Template Table 1000, the IDS system also includes two new database tables: the IDS Table 1010 (Database:IDS) and the IDS Configuration Table 1020 (Database:IDS Config).

The LDAPUTL.DLL 960 contains all code required for Directory Server communication via the LDAP protocol.

The IDSXL8R.DLL 970 contains "LDAP to OPS" and "OPS to LDAP" translation code.

The new IDS architectural and database components are further elaborated upon herein below, as follows:

IDSMAIN 950

This NT process controls the execution of the IDS algorithm depending upon the mode it is operating in. IDSMAIN 950 is started by the scheduler mechanism discussed above when an IDS scheduled event matures. As discussed above, the four types of events that spawn IDSMAIN 950 are Full DS Import, Full DS Export, DS Synchronization and DS Deletion Discovery. IDSMAIN 950 is spawned in one of these three modes and utilizes functionality in LDAPUTL.DLL 960, IDSXL8R.DLL 970, the MAC Actions DLL 972 (MACWRKR.DLL) and the Telephone Directories Utilities DLL 974, as necessary to complete its task.

When all processing is done, IDSMAIN 950 dies. Only one IDSMAIN process 950 can exist on the OPS Manager station 116 at any one time. This means that IDS can be performing only one function at any one time.

LDAPUTL.DLL 960

This is the functional group responsible for all LDAP communication with the DS 118. LDAPUTL.DLL 960 contains functions for initializing the LDAP connection, reading from and writing to the Directory Server 118, and closing the LDAP connection. LDAPUTL.DLL 960 can be used by any process requiring LDAP communication and is specifically designed for use with IDS.

Read functionality of the LDAPUTL.DLL 960 checks for entry additions, modifications and deletions on the DS 118 and writes them to the IDS Import Table of the IDS database 1010 in string format.

Write functionality of the LDAPUTL.DLL 960 exports additions, modifications and deletions from the Teldir Delta Table 990 to the DS 118.

LDAPUTL.DLL 960 is used as a standard DLL by IDSMAIN 950.

IDSXL8R.DLL 970

This is the functional group responsible for all translation between LDAP format data (strings) and OPS Manager format data (internal OPS Manager data structures). IDSXL8R.DLL 970 can be used by any process requiring LDAP to OPS and OPS to LDAP data translation.

LDAP to OPS translation reads an entry from the IDS Import Table of database 1010, consults the existing OPS Teldir database 980 to help perform the translation and passes the translated information back to the caller.

OPS to LDAP translation reads an entry from the Teldir Delta Table 990 for the DS 118 and performs translation based upon the action in the table (ADD, DEL, MOD, or MODKEY). The translated entry is then written to an IDS data structure and returned to the caller. IDSXL8R.DLL 970 is used as a standard DLL by IDSMAIN 950.

IDS Table 1010

This table is used when importing directory entries from the DS 118 to store all incoming LDAP information.

| ID | Name | Number | Dept. | Location | Home Element | Device Type | PLID | Private # | isDeleted | modify timestamp |
|---|---|---|---|---|---|---|---|---|---|---|
| (string) | (string) | (string) | (string) | (string) | (string) | (string) | (string) | (bool) | (bool) | (string) |

When importing from the DS 118, functions from LDAPUTL.DLL 960 write entries into the table 1010 and functions from IDSXL8R.DLL 970 read entries from the table 1010. The read functions in IDSXL8R.DLL 970 are responsible for deleting entries once they have been processed.

The IDS table 1010 is written to and read from using standard database calls.

IDS Configuration Table 1020

The IDS Configuration Table 1020 contains only one record and is configured through the IDS Configuration user interface (UI). This table is used by LDAPUTL.DLL 960 when establishing a connection and by IDSXL8R.DLL 970 when determining what template to apply to translated entries.

The fields in table 1020 are as follows:

| ID | Name | Number | Dept. | Location | Home Element | Device Type | PLID | Private # | isDeleted | modify timestamp |
|---|---|---|---|---|---|---|---|---|---|---|
| (string) | (string) | (string) | (string) | (string) | (string) | (string) | (string) | (bool) | (bool) | (string) |

LDAPUTL.DLL 960 reads this record to determine which DS 118 to open a connection to (i.e. hostname) and authenticates with the DS 118 using a Login Account and Login Password. The Last Checked value is used to store the time of the last query of DS 118 for changes.

IDSXL8R.DLL 970 reads this record to determine which Move, Add, or Change template to apply to a translated entry.

Detailed Architectural Description

A detailed description of the individual IDS components: IDSMAIN 950, LDAPUTL.DLL 960, IDSXL8R.DLL 970, IDS Table 1010 and the IDS Configuration Table 1020, will now be provided.

The IDS Process 950 (IDSMAIN.EXE) is the main controller process for the IDS mechanism. It operates in one of four modes: (1) Full DS Import; (2) Full DS Export, (3) DS Synchronization and (4) DS Deletion Discovery.

Figure 8:
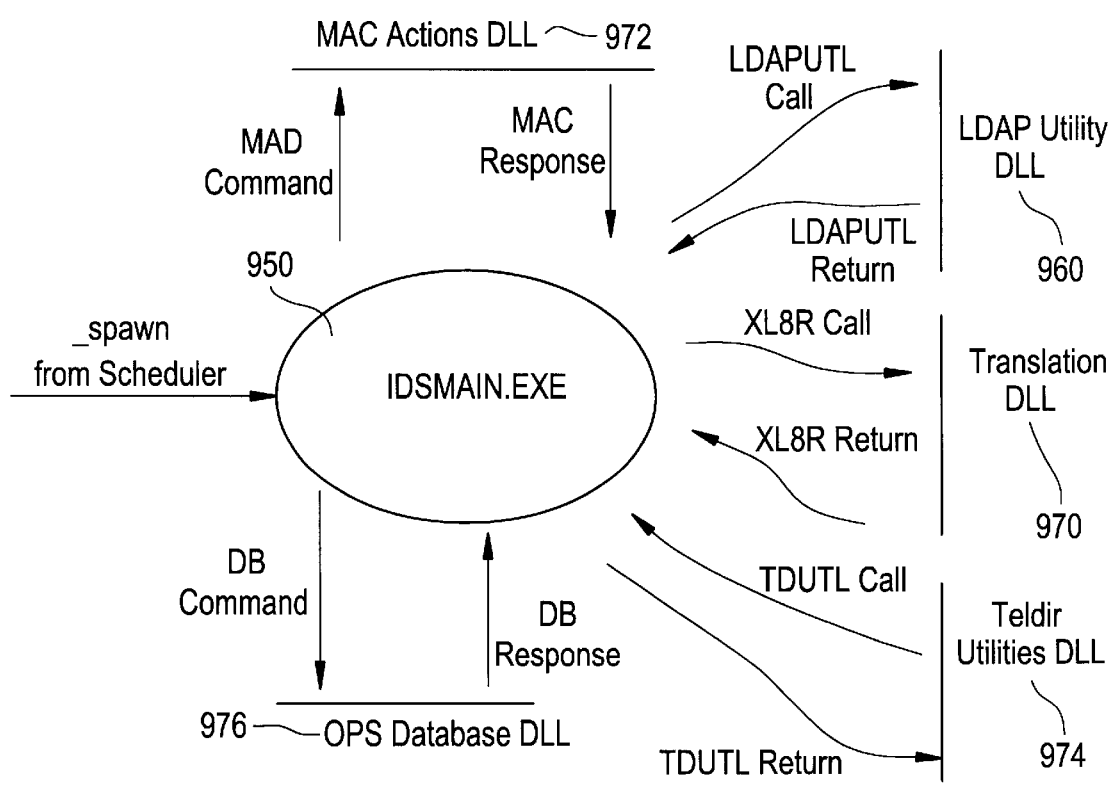
FIG. 8 is a message and data flow diagram for the IDSMAIN process according to the preferred embodiment.

FIG. 8 shows the message and data flow for the IDSMAIN process 950 from which the following inputs/outputs are processed:

1) _spawn from scheduler—process initialization with parameter
2) LDAPUTL calls/returns
3) IDSXL8R calls/returns
4) MAC calls/returns
5) DB calls/returns
6) TDUTL calls/returns The following data structures are used in IDSMAIN 950:

1) LDAPUTL Data Structures—ldapSession_t (discussed in greater detail below)
2) OPS Manager Database—no MAC Data Structures are visible to the IDS system of the present invention. IDS uses only a data structure handle and the functions GetAttribute and SetAttribute to modify elements within the handle.
3) OPS Manager Database—The following is the OPS Manager Teldir Data Structure:

```
typedef struct {
    char            userName        [ MAX_TELDIR_NAME_LENGTH + 1 ];
    char            phoneNumber     [ MAX_TELDIR_PHONE_NUMBER_LENGTH + 1
};
    boolean         primeValue;
    boolean         privacyValue;
    char            firstComment    [ MAX_TELDIR_COMMENT_LENGTH + 1 ];
    char            secondComment   [ MAX_TELDIR_COMMENT_LENGTH + 1 ];
    departmentView_t dept;
    locationView_t  loc;
    componentView_t dist;
    componentView_t home;
    int             clusterId;
    plid_t              extPLID;
    mnmsDeviceType_t deviceType;
    char                idsID[MAX_IDS_ID_LENGTH+1];
    boolean             unManaged;
} telDirView_t;
```

4) Modifications/Additions—One new module is required for the IDSMAIN code: namely idsmain.c There are four algorithms for the IDSMAIN process 950 (one for each operating mode): Full DS Import, Full DS Export, DS Synchronization and Deletion Discovery.

Figure 9:
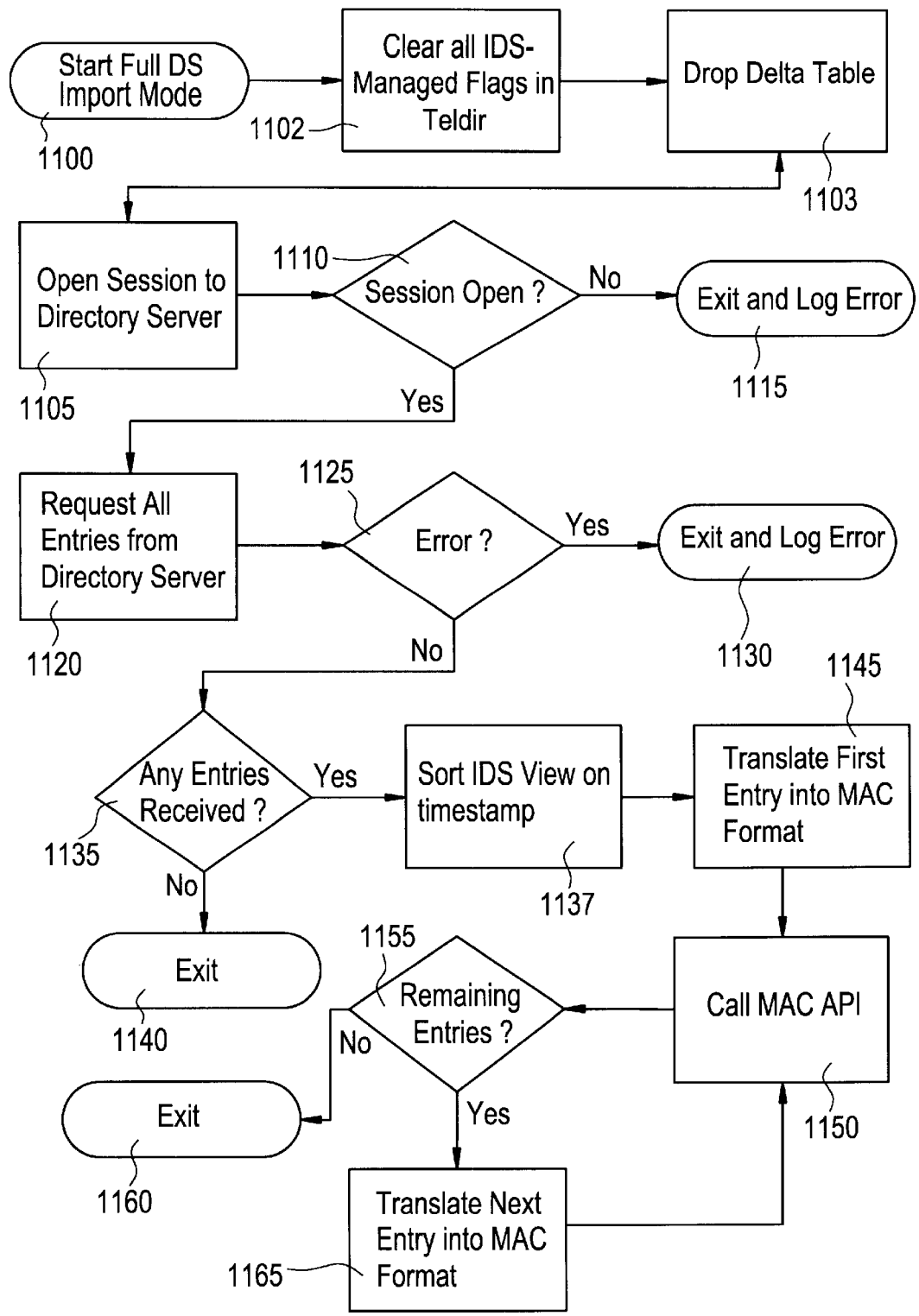
FIG. 9 is a flowchart showing the steps of a full DS import algorithm in accordance with the present invention.

FIG. 9 shows the basic algorithm and error handling of the Full DS Import Algorithm.

At step 1100, the full DS import mode is entered. At step 1102, all IDS-managed flags in Teldir table 980 are cleared. Next, at step 1103, the Delta Table 990 is dropped. A session is opened to the directory server 118 at step 1105. At step 1110, the algorithm determines whether the session has been opened. If not, the algorithm exits and logs an error (step 1115). If a session has been opened, the algorithm requests all entries from the directory server 118 (step 1120). If any error is detected at step 1125, the algorithm exits and logs an error (step 1130). If the request for all entries from the directory server does not produce an error, the algorithm detects whether any entries have been received (step 1135). If not, the algorithm exits (step 1140).

If entries have been received, IDS View is sorted on timestamp (step 1137), and the first entry is translated into MAC format (step 1145). Next, the MAC API (i.e. MAC actions DLL 972) is called (step 1150). If there are no remaining entries (step 1155), the session is closed and the algorithm exits (step 1160). If there are remaining entries, the next entry is translated into MAC format (step 1165) and the MAC API is called again at step 1150. Steps 1155, 1165 and 1150 are repeated, as necessary, to translate the remaining the entries.

Figure 10:
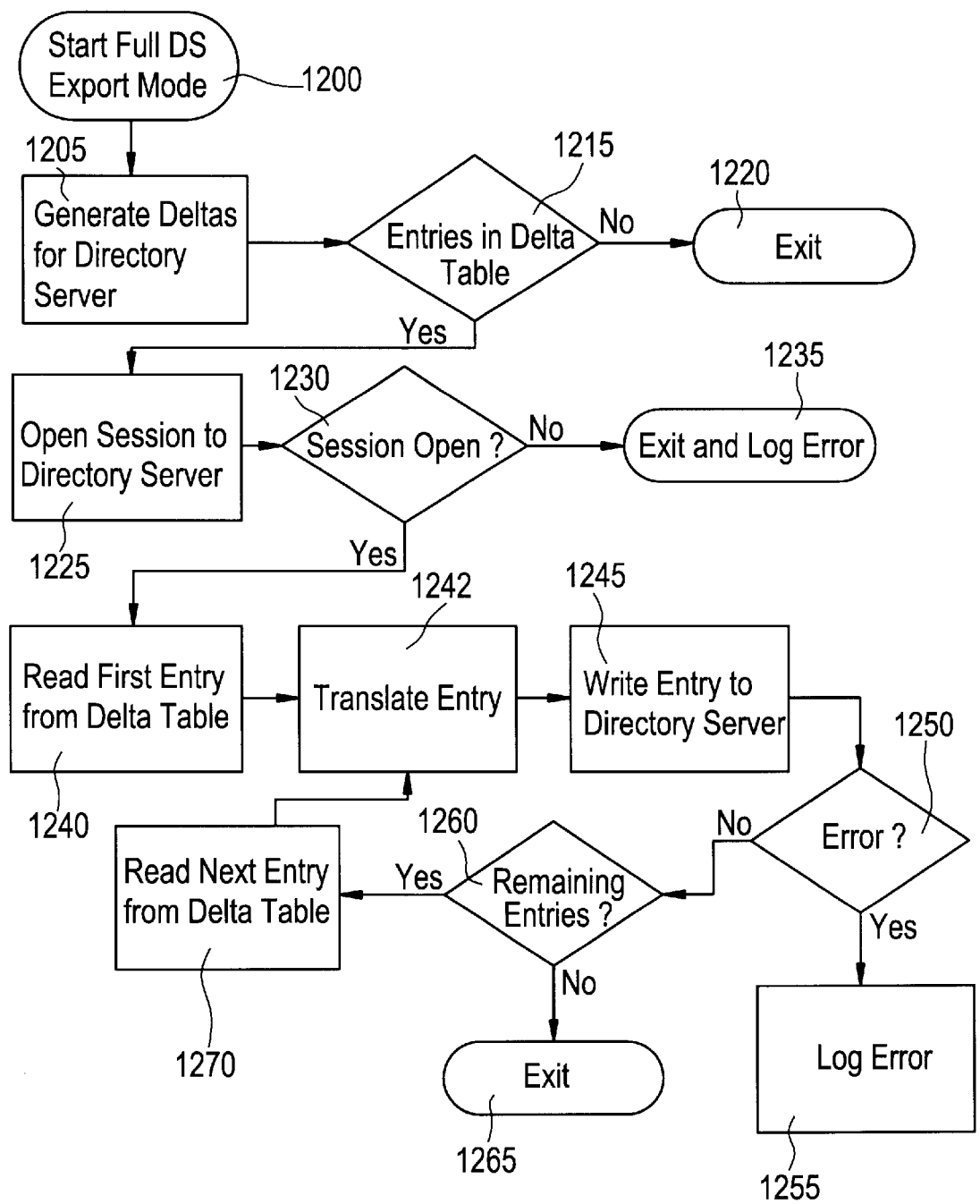
FIG. 10 is a flowchart showing the steps of a full DS export algorithm in accordance with the present invention.

With reference to FIG. 10, the full DS export algorithm is illustrated. At step 1200, the full DS export mode is started. Deltas are generated for the directory server 118 at step 1205. At step 1215, the algorithm queries whether there are any entries in the Delta Table 990. If not, the algorithm exits at step 1220.

If entries are detected in the export table, a session is opened to the directory the server 118, at step 1225. The algorithm then confirms whether or not the session has been opened (step 1230). If the session has not been opened, then the algorithm exists and logs an error at step 1235.

If a session with the DS 118 has been opened, as detected via step 1230, then the algorithm reads the first entry from the Delta Table 990 (step 1240) and translates the entry via IDSXL8R.DLL (step 1242). This entry is then written to the directory server 118, at step 1245. The algorithm then determines whether there has been any error writing the entry to the directory server (step 1250). If not, the algorithm determines whether there are any remaining entries (step 1260). If not, then the session is closed and the algorithm exists (step 1265).

If errors are detected in writing the entry to the directory server 118 (step 1250), then an error is logged (step 1255) and the algorithm determines whether there are any remaining entries (step 1260). If, at step 1260,remaining entries are detected by the algorithm, the algorithm reads the next entry from the Delta Table 990 (step 1270) and returns to step 1242.

The steps 1242, 1245, 1250, 1260 and 1270, or steps 1242, 1245, 1250, 1255, 1260 and 1270 are repeated, as necessary, for any remaining entries.

Figure 11:
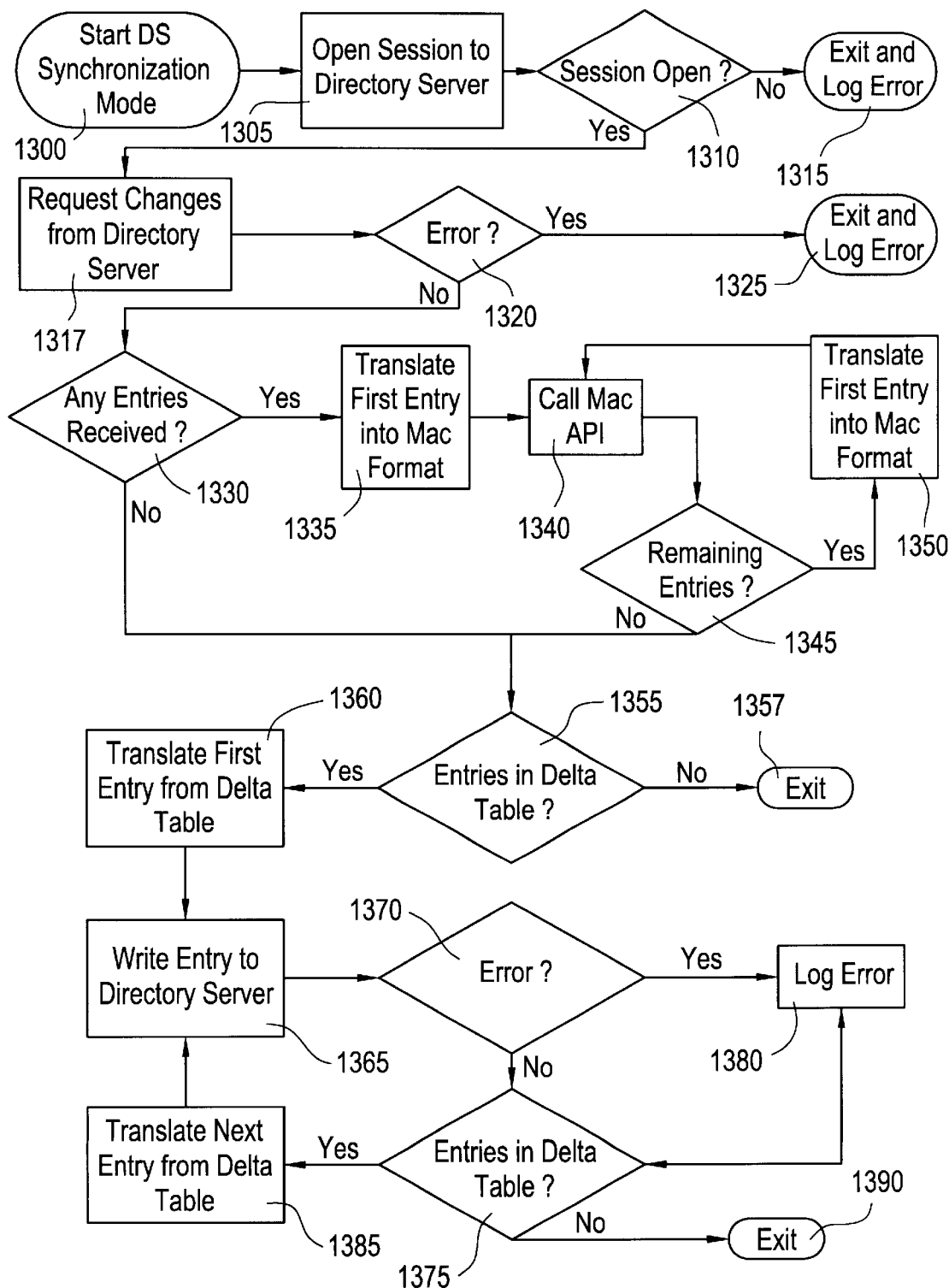
FIG. 11 is a flowchart showing the steps of a DS synchronization algorithm according to the preferred embodiment.

The flow chart for the basic algorithm and basic error handling of the DS synchronization algorithm, is shown in FIG. 11.

The algorithm starts DS synchronization mode at step 1300. Next, the algorithm opens the session to the DS server 118 (step 1305). The algorithm then determines whether or not the session with the DS has been opened (step 1310). If not, the algorithm exits and logs an error (step 1315).

If the algorithm has opened a session with the DS server 118 (step 1310), then changes are requested from the directory server (step 1317). If any error is detected in the requested changes from the directory server (step 1320), the algorithm exits and logs an error (step 1325).

If no error is detected in the requested changes from the directory server (step 1320), then the algorithm detects whether any entries have been received (step 1330). If entries have been received, then the algorithm translates the first entry into MAC format (step 1335), calls the MAC API (step 1340), determines whether there are any remaining entries (step 1345), and, if so, translates the next entry into MAC format (step 1350), and again calls the MAC API (step 1340). Steps 1340, 1345 and 1350 are re-executed, as necessary, for the remaining entries from the directory server 118.

If, at step 1330, no entries have been received or if, at step 1345, there are no remaining entries, then the algorithm determines whether there are any entries in the Delta Table 990 (step 1355). If not, the algorithm exits at step 1357. If there are entries in the Delta Table 990, then the algorithm translates the first entry (step 1360) and writes the translated entry to the DS 118 (step 1365). Provided there is no error in writing the entry to the directory server (step 1370), the algorithm determines whether there are any remaining entries (step 1375). If there are remaining entries, the next entry is translated from the Delta Table 990 (step 1385) and the entry is written to the directory server 118 (step 1365).

If an error is detected in writing the entry to the directory server (step 1370), the algorithm logs an error (step 1380) and proceeds to step 1375 to determine whether there are any remaining entries.

Steps 1375, 1385, 1365 and 1370, or steps 1375, 1385, 1365, 1370 and 1380 are re-executed, as necessary, for any remaining entries.

Once there are no remaining entries (step 1375) the algorithm exits (step 1390).

Figure 12:
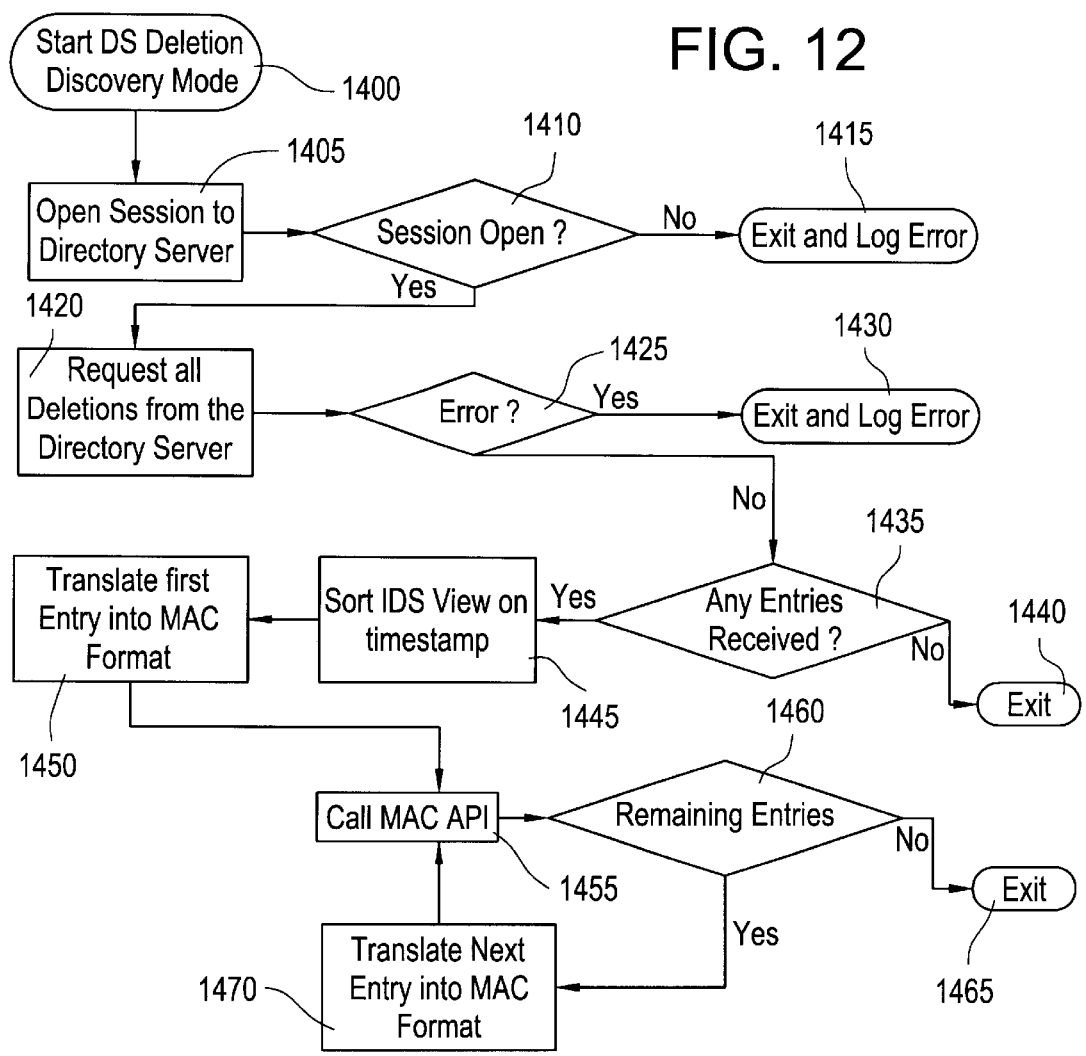
FIG. 12 is a flowchart showing the steps of a DS deletion discovery algorithm according to the preferred embodiment.

The algorithm steps for the DS Deletion Discovery mode are set forth in the flowchart of FIG. 12.

The DS Deletion Discovery mode is entered at step 1400. A session with the DS 118 is opened at step 1405. The algorithm then checks that a DS session has been opened (step 1410) and if not logs an error and exits at step 1415. If the DS session has been opened, then the algorithm requests all deleted entries from the DS 118 (step 1420). If any error is detected (step 1425) then the algorithm logs and error and exits (step 1440). Provided no error is detected (step 1425), the algorithm checks to see whether any entries have been received (step 1435). If not, the algorithm exits (step 1440). If entries have been received, the IDS view is sorted on timestamp (step 1445). The first entry is then translated into MAC format (step 1450) and the MAC API is called (step 1445). If there are no remaining entries (step 1460), the algorithm exits at step 1465. If entries remain, then the next entry is translated (step 1470) and steps 1455, 1460 and 1470 are repeated as necessary until there are no remaining entries.

Figure 13:
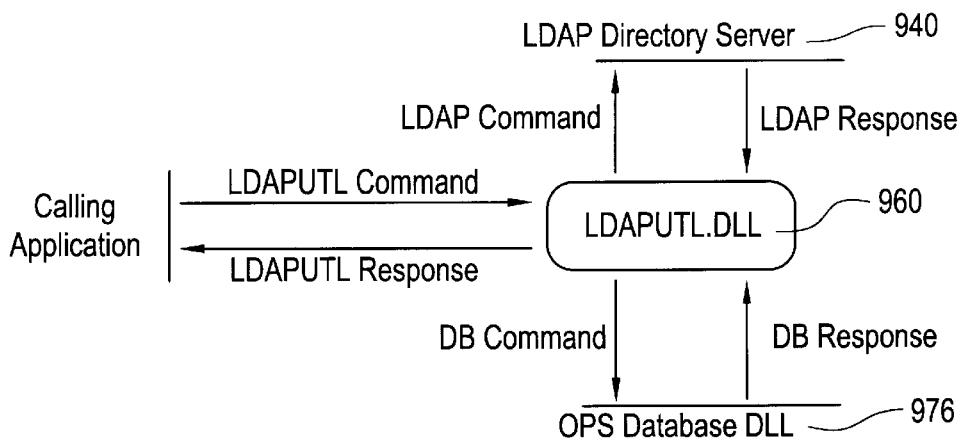
FIG. 13 is a message and data flow diagram of a LDAPUTL.DLL according to the preferred embodiment.

The LDAPUTL.DLL 960 is responsible for all communication with the Directory Server 118, and is used primarily by the IDSMAIN process 950 as required. In fact, any process requiring Directory Server access via LDAP may use this DLL. Communication with the DS 118 is done solely through the LDAP protocol. FIG. 13 shows the message and data flow for LDAPUTL.DLL 960, wherein the input and output can be further subdivided into LDAPUTL API, LDAP Server I/O and OPS Manager Database I/O.

The following functions are exported by the LDAPUTL.DLL:

LDAPUTL_GetSessionDefaults—retrieves LDAP session defaults from the OPS Manager database and sets up an ldapSession_t structure appropriately.

```
int LDAPUTL_GetSessionDefaults (
    int           dbId,
    ldapSession_t *pLDAPSesion );
```

LDAPUTL_OpenSession—opens a session to and authenticates with an LDAP Directory Server.

```
         int LDAPUTL_OpenSession (
              ldapSession_t    ldapSession );
```

LDAPUTL_CloseSession—closes the currently open LDAP session.

```
         int LDAPUTL_CloseSession ( ) ;
```

LDAPUTL_Get—gets entries from the directory server and places entries in the IDS Table 1010 in the database.

```
int  LDAPUTL_Get (
     idsGetOp_t      idsGetOp,     /* IDS_GET_ALL | IDS_GET_CHANGES */
     ldapSession_t   ldapSession
) ;
```

LDAPUTL_Put—reads entries from the IDS Table 1010 and sends an LDAPMessage to the directory server for each entry.

```
         int LDAPUTL_Put (
              ldapSession_t    ldapSession
         ) ;
```

The following LDAP commands transmit and receive data over the network between the DS 118 and OPS Manager 116. The responses to the commands are given within the context of the command. (All of the calls given here are asynchronous):

ldap_open—Initializes the LDAP library and connects to the DS.
ldap_search—Initiates an LDAP search operation.
ldap_compare—Initiates an LDAP operation to compare a value with an attribute value contained in an entry.
ldap_bind—Initiates an LDAP operation to identify, or authenticate IDS to the DS using a Distinguished Name (DN) and some arbitrary credentials.
ldap_unbind—Disposes of an LDAP session, freeing all associated resources.
ldap_modify—Initiates an LDAP modify entry operation.
ldap_add—Initiates an LDAP add entry operation.
ldap_delete—Initiates an LDAP delete entry operation.
ldap_modrdn—Initiates an LDAP modify operation to change the name of an entry.
ldap_result—Retrieves the result of an LDAP operation initiated using an asynchronous LDAP call.
The following routines are used to parse results from LDAPUTL_Get( ):
ldap_first_entry—Returns the first entry in a chain of results.
ldap_next_entry—Returns the next entry in a chain of results.
ldap_first_attribute—Returns the first entry in an entry.
ldap_next_attribute—Returns the next entry in an entry.
ldap_get_values—Retrieves a set of attribute values from an entry.

In terms of database I/O, standard database calls are used to access the OPS Manager database, as follows:
DBView_Login( )
DBView_Logout( )
DBView_ReadTuple
DBView_WriteTuple
The following tables are accessed:
IDS Table 1010

IDS Configuration Table 1020

The LDAP data structures are divided into OPS Manager database tables, internal data structures and standard LDAP data structures.

The data structure for OPS Manager Database tables is set forth in the IDS Configuration Table 1020 which stores the DS 118 configurations for OPS Manager 116, and the IDS Table 1010 discussed above. The format of the IDS Configuration Table 1020 is as follows:

| ID | Login Account | Login Password | Hostname | Add Template | Move Template | Change Template | Last Checked |
|---|---|---|---|---|---|---|---|
| (number) | (string) | (string) | (string) | (string) | (string) | (string) | (string) |

The LDAPUTL data structures are as follows:

ldapSession_t—a structure to store the current LDAP Session settings.

```
typedef struct ldaputlSession {
    char    host[256];         /* hostname of the DS */
    int     port;              /* port to connect to */
    char    userName [256];    /* username for authentication */
    char    password [256];    /* password for authentication */
} ldaputlSession_t;
``` ldapGetOp_t—an enum specifying the type of Get operation to perform.

```
typedef enum ldaputlGetOp {
    LDAPUTL_GET_ALL,
    LDAPUTL_GET_CHANGES,
```

-continued

```
            LDAPUTL_GET_DELETES,
            LDAPUTL_GET_END
        } ldaputlGetOp_t;
```

The standard LDAP data structure used is:

LDAPMod—a structure used to specify the changes to be made to an LDAP entry. This data structure is used by ldap_add and ldap_modify. The data structure is as follows:

```
typedef struct ldapmod {
        int     mod_op;
        char    *mod_type;
        union {
                char                    **modv_strvals;
                struct berval   **modv_bvals;
        } mod_vals;
} LDAPMod;
```

The mod_op (operation) can be one of: LDAP_MOD_ADD, LDAP_MOD_DELETE or LDAP_MOD_REPLACE There are three read algorithms and one write algorithm in LDAPUTL.DLL 960. All read algorithms interface with either Lotus Notes® or Microsoft Exchange® wherein in response to a read request, the standard LDAP attributes are requested and if nothing is returned, Microsoft attributes are requested. The write algorithm also takes into account the differences between standard LDAP attributes and Exchange attributes.

Figure 14:
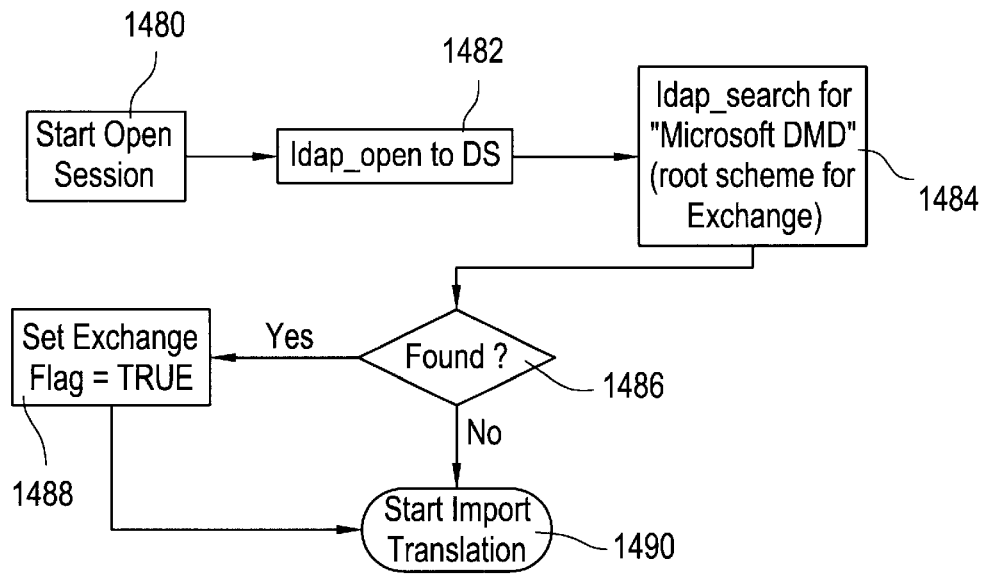
FIG. 14 is a flowchart showing the steps of an algorithm for opening a session with the DS in accordance with the present invention.

The open session algorithm is illustrated in FIG. 14 for opening a session with the DS 118 and determining whether the DS 118 is an Exchange server. At step 1480, the session is opened. The ldap_open command is sent to DS 118 (step 1482) and ldap_search is executed for "Microsoft DMD" (the root schema for Exchange), at step 1484. If "Microsoft DMD" is found (step 1486), then an Exchange Flag is set at TRUE (step 1488) and import translation is started (step 1490). Otherwise, the import translation is started without identifying the DS 118 as an Exchange server.

Figure 15:
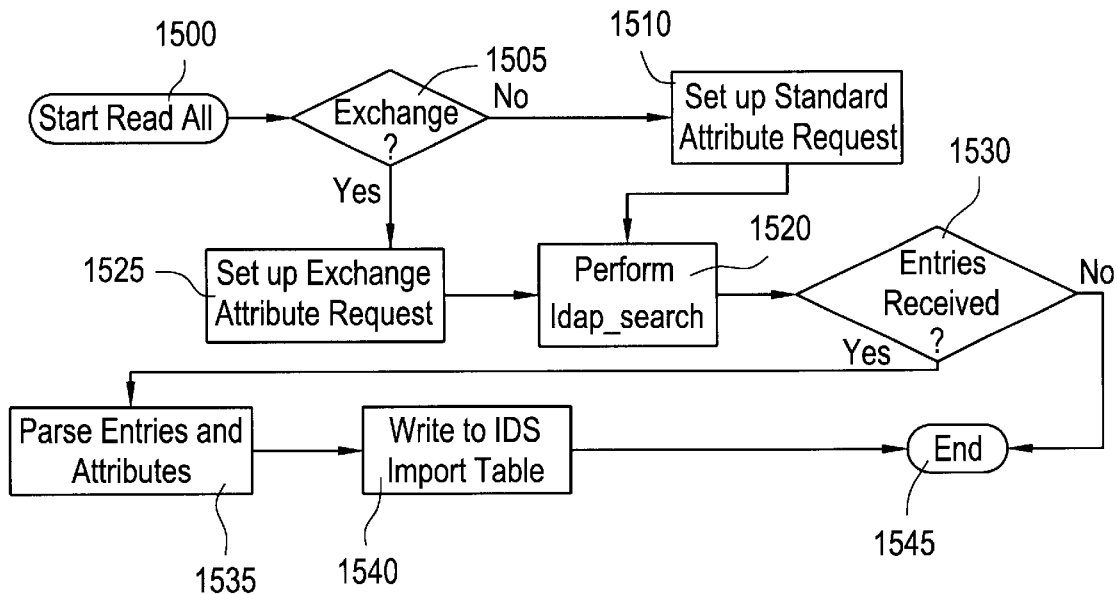
FIG. 15 is a flowchart showing the steps of an import from DS algorithm in accordance with the present invention.

The first read algorithm, depicted in FIG. 15, is used for importing all entries from the DS 118. At step 1500, the Read All algorithm is started. At step 1505 the Exchange Flag is checked to see whether DS 118 is an Exchange server. If not, the standard LDAP attributes are set (step 1510) and an ldap_search is performed (step 1520). If the DS 118 is identified as being an Exchange server, then the Exchange attributes are set (step 1525) and the ldap_search is performed (step 1520).

If any entries are received (step 1530), then the entries and attributes are parsed (step 1535) and written to the IDS Table 1010 (step 1540) and the program exits (step 1545). If no entries are received at step 1530, then the program exits immediately (step 1545).

Figure 16:
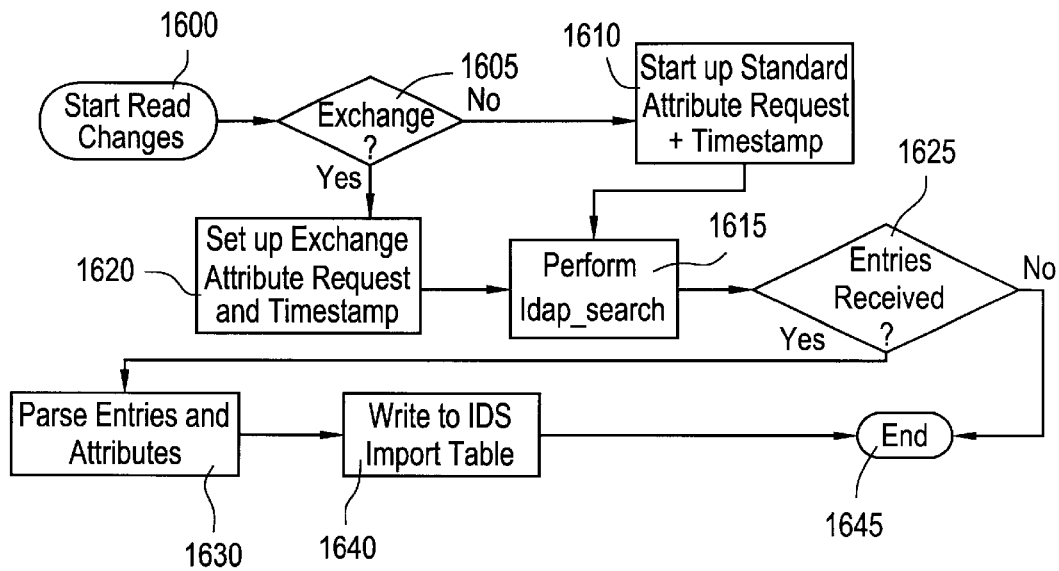
FIG. 16 is a flowchart showing the steps of an algorithm for reading only changed entries from the DS according to the preferred embodiment.

The second read algorithm is shown in FIG. 16 and is used for reading only changed entries from the DS 118. At step 1600, the Read Changes algorithm is started. At step 1605 the Exchange Flag is checked to see whether DS 118 is an Exchange server. If not, the standard LDAP attributes and timestamp are set (step 1610) and an ldap_search is performed (step 1615). If the DS 118 is identified as being an Exchange server, then the Exchange attributes and timestamp are set (step 1620) and the ldap_search is performed (step 1615).

If any entries are received (step 1625), then the entries and attributes are parsed (step 1630) and written to the IDS Table 1010 (step 1640) and the program exits (step 1645). If no entries are received at step 1625, then the program exits immediately (step 1645).

Figure 17:
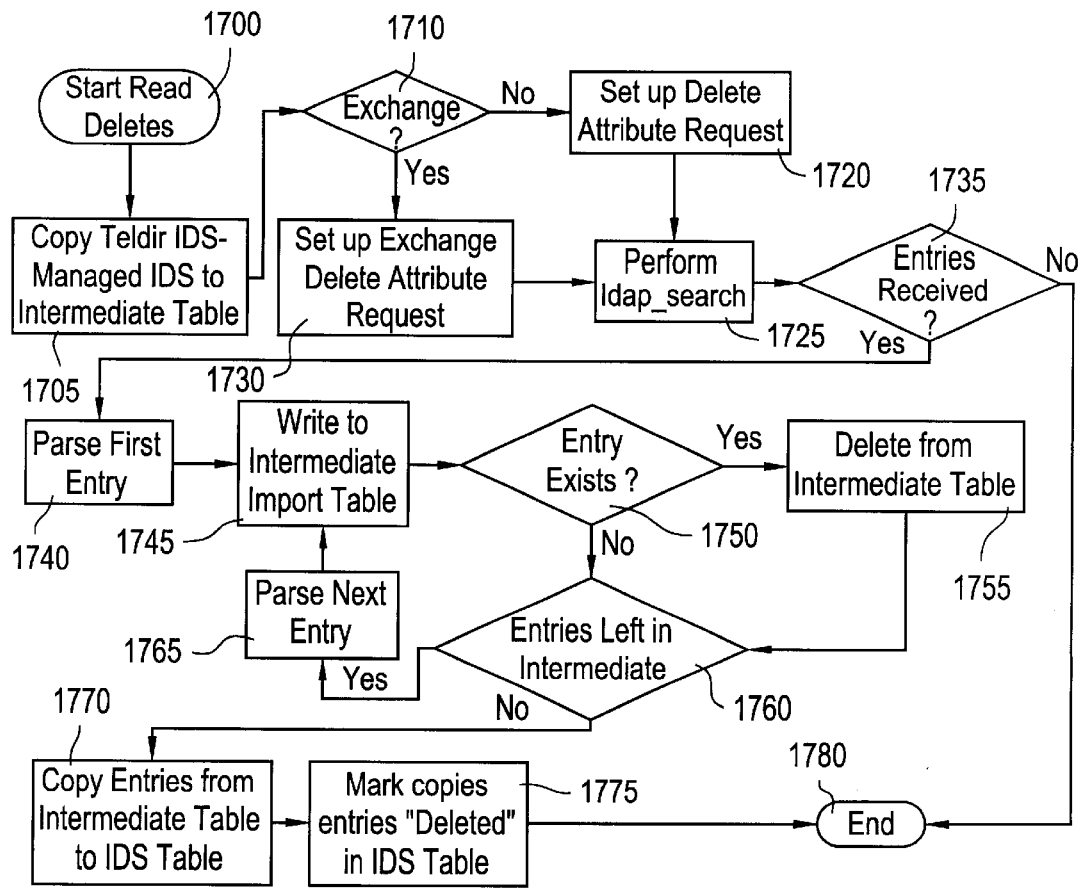
FIG. 17 is a flowchart showing the steps of an algorithm for reading only deleted entries from the DS according to the preferred embodiment.

The third read algorithm is depicted in FIG. 17 and is used for reading deleted entries from the DS 118. In reality, the algorithm reads all entries from the DS 118, but only deletes specific attributes—namely the IDS identifier. At the conclusion of the algorithm, the only remaining entries in the IDS Table 1010 are the entries that must be deleted from OPS Manager 116.

At step 1700, the Read Deletes algorithm is started. The Teldir IDS-Managed Ids from table 980 are copied to an intermediate table (step 1705). At step 1710, the algorithm checks the Exchange Flag to determine whether DS 118 is an Exchange server. If not, a delete attribute request is set (step 1720) and the ldap_search is executed (step 1725). If DS 118 is identified as an Exchange server, then the Exchange Delete Attribute request is set (step 1730) and the ldap_search is executed (step 1725).

Next, the algorithm checks to see if any entries have been received (step 1735). If yes, then the first entry is parsed (step 1740) and written to an intermediate import table (step 1745). If the particular entry exists in the intermediate table (step 1750) then the entry is deleted from the intermediate table (step 1755) and the algorithm determines whether any entries are left in the intermediate table (step 1760). If the received entry does not exist at step 1750, then the algorithm immediately determines whether there are any remaining entries in the intermediate table (step 1760). If there are entries left, then the next entry is parsed (step 1765) and written to the intermediate table (step 1745). Steps 1745, 1750, 1760, 1765 (and optionally step 1755), are repeated as necessary until no entries remain in the intermediate table, at which point the algorithm copies the entries from the intermediate table to the IDS table 1010 (step 1770) and marks copied entries in the table 1010 as "deleted" (step 1775) and the algorithm exits (step 1780). If no entries are received at step 1735, the algorithm exits immediately (step 1780).

Figure 18:
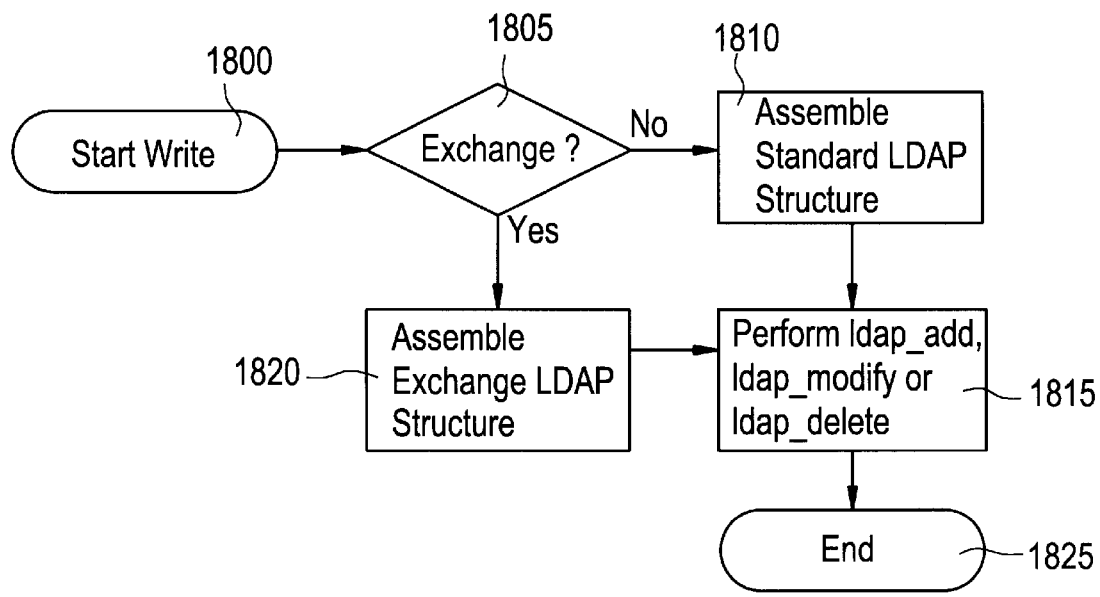
FIG. 18 is a flowchart showing the steps of an algorithm for writing entries to the DS according to the preferred embodiment.

The write algorithm is depicted in FIG. 18 for writing entries to the DS 118. At step 1800 the program starts. At step 1805 the Exchange Flag is checked to see whether DS 118 is an Exchange server. If not, the standard LDAP data structure is assembled (step 1810) and one of either an ldpa_add, ldap_modify or ldap_delete is performed (step 1815). If the DS 118 is identified as being an Exchange server, then the Exchange data structure is assembled (step 1820) and one of either an ldpa_add, ldap_modify or ldap_delete is performed (step 1815). The algorithm exits at step 1825.

Figure 19:
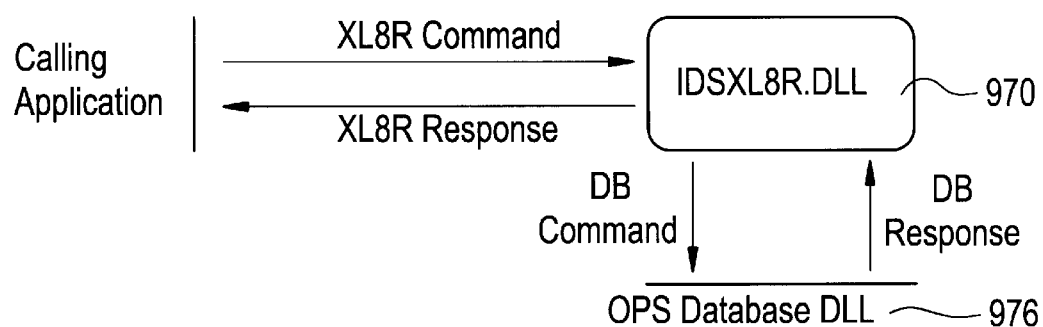
FIG. 19 is a message and data flow diagram for a IDSXL8R.DLL (i.e. translator) DLL according to the preferred embodiment.

The Import/Export Translator DLL (IDSXL8R.DLL) translates between the generic LDAP format required by the Directory Server 118 and the proprietary format used by OPS Manager 116. It performs translation on both incoming and outgoing data. FIG. 19 shows the message and data flow for the IDSXL8R.DLL 970.

The following functions are exported by IDSXL8R.DLL:

IDSXL8R_ImportTableToMAC—reads the first entry from the IDS Table 1010, attempts to resolve the entry to OPS Manager Teldir 980 and returns the MAC action that is required for the entry along with a corresponding Teldir tuple if one exists (on a Move or Change).

```
int IDSXL8R_ImportTableToMAC (
    int            dbId,
    idsView_t      *idsTuple,
    telDirView_t   *teldirTuple )
```

IDSXL8R_DeltaTableToIDSTuple—reads first entry in the Delta table 990 for the directory server 118 and writes it into an IDS tuple data structure and returns the appropriate LDAP action.

```
int IDSXL8R_DeltaToIDSTuple ( void )
```

Standard database calls are used to access the OPS Manager database:
DBView_Login( )
DBView_Logout( )
DBView_ReadTuple
DBView_WriteTuple
The following tables are accessed:
IDS Table 1010
IDS Configuration Table 1020
DS Teldir Delta Table 990
Teldir Table 980

The data structures used by the Import/Export Translation DLL 970 include the IDS Table 1010, IDS Configuration Table 1020, Teldir Table 980 and Teldir Delta Table 990 discussed above, for the OPS Manager Database.

There are two algorithms for the IDSXL8R.DLL 970. One algorithm is for incoming translation and one is for outgoing translation.

Incoming Translation Algorithm

Figure 20:
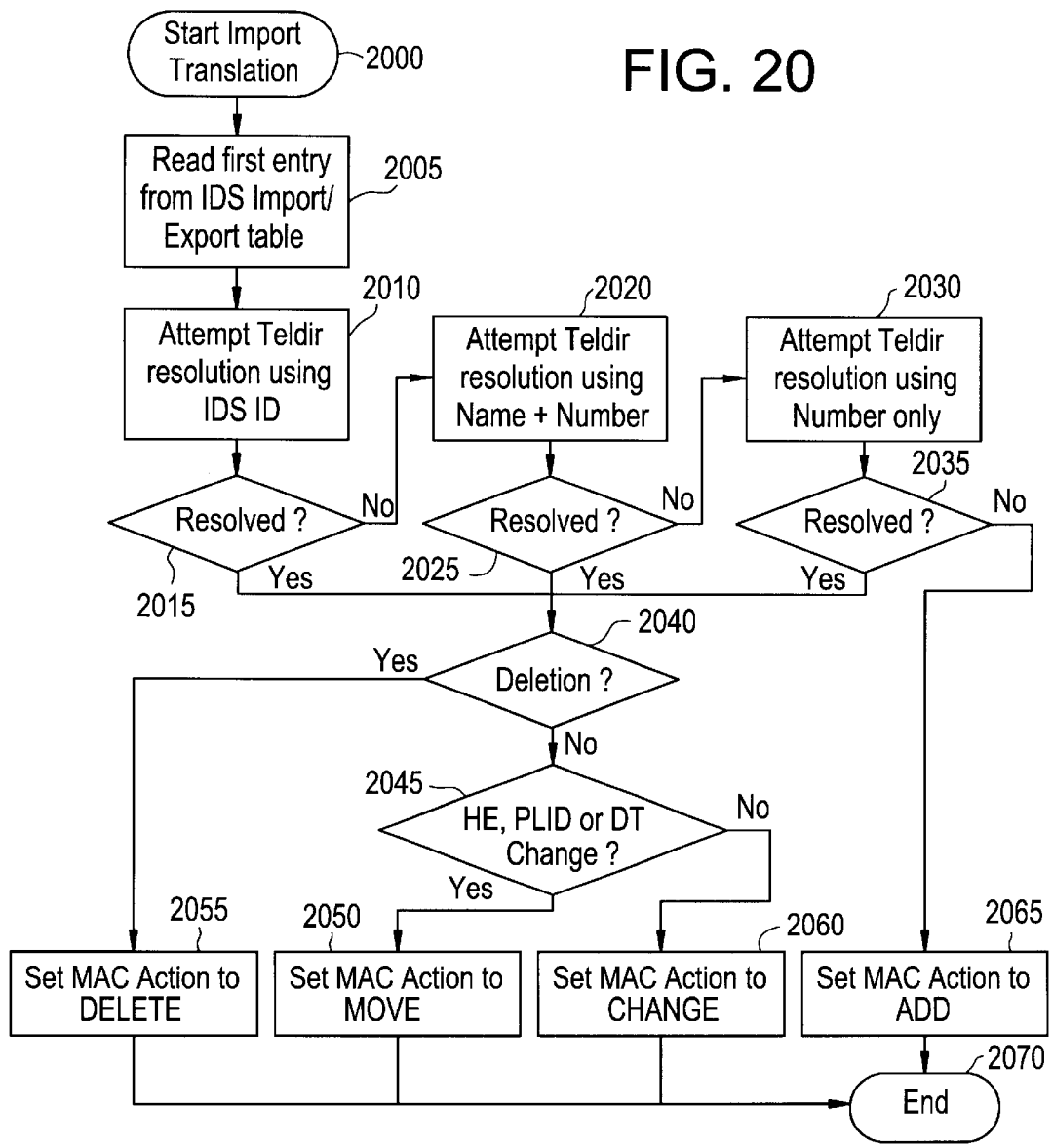
FIG. 20 is a flowchart showing the steps of a translation algorithm for converting between entries in LDAP format and MAC format according to the preferred embodiment.

Incoming translation is a conversion between the IDS Table 1010 format and the MAC format. The full algorithm is shown in FIG. 20. At step 2000, the import translation algorithm is started. At step 2005, the first entry is read from IDS Table 1010. The algorithm then attempts a Teldir resolution using IDS ID (step 2010). If resolution is not successful (step 2015) then the algorithm attempts a Teldir resolution using Name and Number (step 2020). If the resolution is still not successful, then the algorithm attempts resolution using Number only (step 2030).

If the resolution is successful in any of steps 2015, 2025 or 2035, then the algorithm determines whether an entry deletion is being requested (step 2040). If not, the algorithm determines whether Home Element, PLID or Device Type are being changed (step 2045). If yes, the algorithm sets MAC action to MOVE (step 2050). If no, then the algorithm sets MAC action to CHANGE (step 2060). If the algorithm determines that an entry deletion is to be performed (step 2040), then MAC action is set to DELETE (step 2055).

If the resolution attempt at step 2035 is unsuccessful, then the MAC action is set to ADD (step 2065). After any one of steps 2055, 2055, 2060 or 2065 are executed, then the algorithm exits at step 2070.

Outdoing Translation Algorithm

Outgoing translation is a conversion between the Teldir Delta Table 990 format and the Table 1010 format. The delta action field in the tuple can be directly translated to an LDAP action with no check to the OPS Teldir database 980 being required. The following mapping applies:

| TELDIR DELTA ACTION | LDAP ACTION |
| --- | --- |
| ADD | ADD |
| MOD | MODIFY |
| MODKEY | MODIFY |
| DEL | MODIFY |

Most of the mapped fields are direct copies of their Teldir delta counterparts while other fields require enum to string conversion. Fields that can be directly copied are:
name—string copy
number—string copy
private number—boolean copy
home element—string copy
department—string copy
location—string copy
Fields requiring conversions are:
plid—plid to string—array of integers to space delimited text.
device type—enum to string—structure may already exist in MAC.

Figure 21:
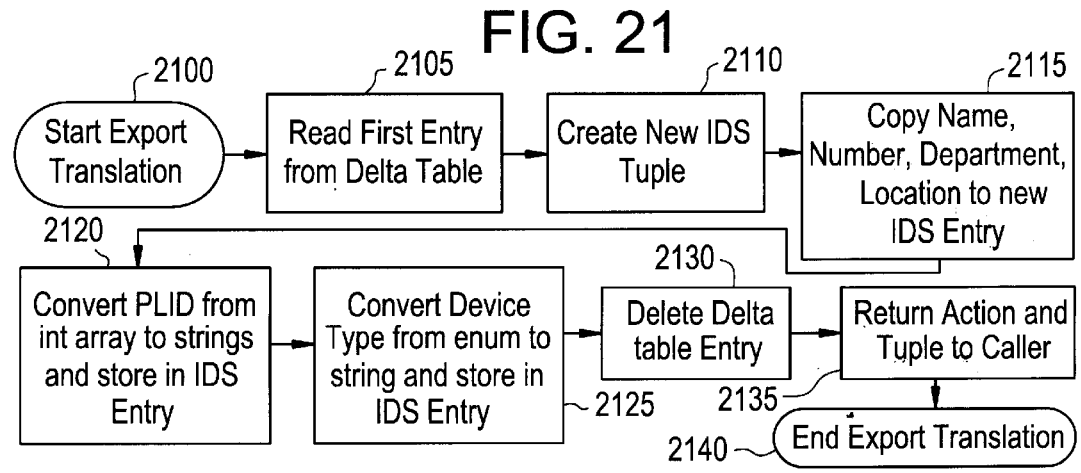
FIG. 21 is a flowchart showing the steps of a translation algorithm for converting between entries in Teldir Delta Table format and LDAP Export format according to the preferred embodiment.

Once all conversions have been identified, the algorithm shown in FIG. 21 can be executed for all outgoing translations. The algorithm is started at step 2100. At step 2105 the first entry is read from DS Teldir Delta Table 990. At step 2110, a new IDS tuple is created. Next, at step 2115, Name, Number, Department and Location are copied to the new IDS entry in Table 1010. Then, at step 2120, PLID is converted from an integer array to space delimited text and stored in the new table entry in Table 1010. The algorithm then converts Device Type from enum to string and stores the conversion in the new table entry in Table 1010. Delta table entries are then deleted (step 2130), a return action and tuple are provided to the caller (step 2135) and the algorithm exits (step 2140).

The foregoing description of a preferred embodiment of the IDS system of the present invention is not restricted to the specific best mode set forth herein. For example, whereas the preferred embodiment sets forth an OPS Manager server 116 which is separate from the PBX 120 which it manages, the IDS system according to the broad aspects of the present invention may be used to directly synchronize records in DS 118 with records in the PBX 120, without the requirement for an external OPS Manager server, by simply incorporating the necessary functionality directly into the PBX. Similarly, rather than managing PBX 120, it is contemplated that OPS Manager 116, or other equivalent server, could be used to control an integrated Voice-LAN system with directory records synchronized to the DS 118. Indeed, the flexible nature of software programming is such that the broad concepts of the invention may be implemented using very different processes and data structures, all of which are believed to be within the sphere and scope of the appended claims.

We claim:

1. An integrated directory services system for synchronizing records in a central directory server with records in a telephony system, comprising:

data storage means for storing directory import and export records; and a process which communicates with said directory server via Lightweight Directory Access Protocol (LDAP) for (i) importing said directory import records from said directory server and writing said directory import records to said data storage means, (ii) reading successive ones of said directory import records from said data storage means and translating said directory import records to said telephony system, whereupon records in said telephony system are synchronized with said directory import records, (iii) reading successive records from said telephony system and in response writing said directory export records to said data storage means, and (iv) reading said directory export records from said data storage means and exporting said directory export records to said directory server, whereupon said records in said directory server are synchronized with said directory export records.

2. The integrated directory services system of claim 1, wherein said process is spawned by one of plurality of scheduled events, including a full import from the directory server, a full export to the directory server, a deletion discovery of records on said directory server and a synchronization of records between said directory server and said telephony system.

3. The integrated directory services system of claim 1, further including an LDAP DLL for initializing an LDAP session between said directory server and said telephony system, reading and writing records to and from said directory server and closing said LDAP session.

4. The integrated directory services system of claim 3, further including a translation DLL for translating between LDAP format data and data structures utilized by said telephony system.

5. The integrated directory services system of claim 4, wherein said data storage means includes a table into which said records are imported from said directory server by said LDAP DLL and from which said records are read by said translation DLL.

6. The integrated directory services system of claim 5, wherein said data storage means further includes a configuration table for storing a single one of said records which is used by said LDAP DLL for determining a hostname for said directory server and authenticating with said directory server when opening said LDAP session, and used by said translation DLL to determine which one of a Move, Add or Change template to apply for said translating between LDAP format data and data structures utilized by said telephony system.

7. The integrated directory services system of claim 1, wherein said telephony system comprises at least two OPS Manager servers each controlling a plurality of PBXs.

8. An integrated directory services system for synchronizing records in a central directory server with records in a telephony system, comprising:
    data storage means for storing directory import and export records; and
    a process which communicates with said directory server via Lightweight Directory Access Protocol (LDAP) for (i) importing said directory import records from said directory server and writing said directory import records to said data storage means, (ii) reading successive ones of said directory import records from said data storage means and translating said directory import records to said telephony system, whereupon records in said telephony system are synchronized with said directory import records, (iii) reading successive records from said telephony system and in response writing said directory export records to said data storage means, and (iv) reading said directory export records from said data storage means and exporting said directory export records to said directory server, whereupon said records in said directory, server are synchronized with said directory export records, and wherein said telephony system comprises at least one PBX under control of an OPS Manager server, and wherein each of said OPS Manager servers is programmed to accept directory records from predetermined ones of said PBXs which are under control of another one of said OPS Manager servers by means of programming virtual representations of said predetermined ones of said PBXs on each said one of said OPS Manager servers, whereby entries from any one of said OPS Manager servers relating to any one of said PBXs may be synchronized with records in said directory server.

9. A method of synchronizing records in a central directory server with records in a telephony system, comprising the steps of:
    importing directory import records from said directory server and writing said directory import records to a data storage means, and reading successive ones of said directory import records from said data storage means and translating said directory import records to said telephony system, whereupon records in said telephony system are synchronized with said directory import records, and
    reading successive directory export records from said telephony system and in response writing said directory export records to said data storage means, and reading said directory export records from said data storage means and exporting said directory export records to said directory server, whereupon said records in said directory server are synchronized with said directory export records.

10. An integrated directory services system for synchronizing directory records of a central directory with a plurality of different directory databases, comprising
    a data storage system for storing said directory records of said central directory;
    a communication system for receiving import records from said different directory databases and transmitting export records to said different directory databases, and for receiving changes to said central directory; and
    a processor for processing each of said import records and, in response thereto, updating said central directory and preparing said export records to update said directory databases having database records corresponding to said each of said import records; and for processing each of said changes to said directory records and, in response thereto, updating said central directory and preparing said export records to update said directory databases having said database records corresponding to said changes.

11. The system of claim 10, further comprising a translation system for at least one of translating one of said import records into a format understandable by said processor and preparing said export records in formats understandable by said different directory databases.

12. The system of claim 11, wherein said central directory comprises one of a Microsoft Exchange server and a Lotus Notes server, and said different directory databases comprise a telephone directory of a PBX.

13. The system of claim 12, wherein said communication system communicates via Lightweight Directory Access Protocol (LDAP).

14. The system of claim 11, wherein each of said import records comprises a portion of one of said directory records and each of said export records comprises a portion of one of said directory records.

15. The system of claim 11, wherein said different directory databases comprises a manager server that synchronizes a plurality of directory databases other than said plurality of different directory databases.

16. The system of claim 10, further comprising a conflict resolution system for resolving conflicts between different updates to said central directory.

* * * * *